US011717910B2

(12) United States Patent
Gold

(10) Patent No.: US 11,717,910 B2
(45) Date of Patent: Aug. 8, 2023

(54) MONITORING OPERATION OF ELECTRON BEAM ADDITIVE MANUFACTURING WITH PIEZOELECTRIC CRYSTALS

(71) Applicant: GENERAL ELECTRIC COMPANY, Schenectady, NY (US)

(72) Inventor: Scott Alan Gold, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 332 days.

(21) Appl. No.: 17/088,231

(22) Filed: Nov. 3, 2020

(65) Prior Publication Data

US 2022/0134467 A1 May 5, 2022

(51) Int. Cl.
*B23K 15/00* (2006.01)
*B33Y 30/00* (2015.01)
(Continued)

(52) U.S. Cl.
CPC ........ *B23K 15/0086* (2013.01); *B23K 15/002* (2013.01); *B23K 15/0013* (2013.01);
(Continued)

(58) Field of Classification Search
CPC ............... G01N 29/12; G01N 29/2443; G01N 2291/0289; B23K 15/0086;
(Continued)

(56) References Cited

U.S. PATENT DOCUMENTS 5,827,952 A 10/1998 Mansure et al.
6,492,601 B1 12/2002 Cain et al.
(Continued)

FOREIGN PATENT DOCUMENTS

EP 1605246 A1 12/2005
EP 3659730 A1 6/2020
WO 2019040843 A1 2/2019

OTHER PUBLICATIONS

Extended European Search Report for EP Application No. 21202669.4 dated Mar. 18, 2022 (11 pages).
(Continued)

*Primary Examiner* — John J Norton
*Assistant Examiner* — Simpson A Chen
(74) *Attorney, Agent, or Firm* — Dinsmore & Shohl LLP

(57) ABSTRACT

Devices, systems, methods, and kits of parts for monitoring operation of an electron beam additive manufacturing systems are disclosed. A monitoring system includes one or more measuring devices positioned on the at least one wall in the interior of a build chamber of the additive manufacturing system. Each one of the one or more measuring devices includes a piezoelectric crystal. The monitoring system further includes an analysis component communicatively coupled to the one or more measuring devices. The analysis component is programmed to receive information pertaining to a frequency of oscillation of the piezoelectric crystal. A collection of material on the one or more measuring devices during formation of an article within the build chamber causes a change to the frequency of oscillation of the piezoelectric crystal that is detectable by the analysis component and usable to determine a potential build anomaly of the article.

11 Claims, 8 Drawing Sheets

(51) Int. Cl.
*B33Y 50/02* (2015.01)
*B23K 15/02* (2006.01)
*G01N 29/12* (2006.01)
*G01N 29/24* (2006.01)

(52) U.S. Cl.
CPC .......... *B23K 15/0026* (2013.01); *B23K 15/02* (2013.01); *B33Y 30/00* (2014.12); *B33Y 50/02* (2014.12); *G01N 29/12* (2013.01); *G01N 29/2443* (2013.01); *G01N 2291/0289* (2013.01)

(58) Field of Classification Search
CPC .............. B23K 15/0013; B23K 15/002; B23K 15/0026; B23K 15/02; B33Y 30/00; B33Y 50/02
USPC ........................................................ 219/76.1
See application file for complete search history.

(56) References Cited

U.S. PATENT DOCUMENTS

| | | | |
|---|---|---|---|
| 8,470,516 | B2 | 6/2013 | Allen et al. |
| 9,121,754 | B2 | 9/2015 | Hines |
| 9,371,577 | B2 | 6/2016 | Perkins et al. |
| 9,395,721 | B2 | 7/2016 | Perkins et al. |
| 9,495,505 | B2 | 11/2016 | Perkins et al. |
| 10,222,701 | B2 | 3/2019 | Zhao et al. |
| 2017/0370884 | A1 | 12/2017 | Jo et al. |
| 2019/0015901 | A1 | 1/2019 | Haberland et al. |
| 2020/0023467 | A1* | 1/2020 | Hunze .................. B29C 64/282 |

OTHER PUBLICATIONS

Magnuson, Martin: "An Electron Beam Heated Evaporation Source", Jan. 1, 1994, XP055899378, URL: https://www.diva-portal.org/smash/get/diva2:1096407/FULLTEXT01.pdf.

Teuscher, Joel et al: "Control and Study of the Stoichiometry in Evaporated Perovskite Solar Cells", CHEMSUSCHEM, vol. 8, No. 22, Oct. 16, 2015, pp. 3847-3852, XP055899387, DE, ISSN: 1864-5631, DOI: 10.1002/cssc.2015 00972.

Aliprandi, Placido et al: "Tensile and Creep Properties Improvement of Ti-6A1-4V 14 Alloy Specimens Produced by Electron Beam Powder Bed Fusion Additive Manufacturing", METALS, vol. 9, No. 11, Nov. 9, 2019, p. 1207, XP055899395, DOI: 10.3390/met9111207.

Riedlbauer Daniel et al: "Macroscopic 1 simulation and experimental measurement of 14 melt pool characteristics in selective electron beam melting of Ti-6A1-4V", The International Journal of Advanced Manufacturing Technology, Springer, London, vol. 88, No. 5, May 12, 2016, pp. 1309-1317, XP036143554, ISSN: 0268-3768, DOI: 10.1007/S00170-016-8819-6.

* cited by examiner

MONITORING OPERATION OF ELECTRON BEAM ADDITIVE MANUFACTURING WITH PIEZOELECTRIC CRYSTALS

FIELD

The present disclosure relates to devices, systems, and methods for monitoring a build chamber of an electron beam additive manufacturing system, and more specifically, for monitoring material present as a result of use of an electron beam within the build chamber.

BACKGROUND

In electron beam based additive manufacturing processes, build quality of components is assessed after the additive manufacturing process is complete. Assessment may occur a significant time after the build process occurs, which can result in several parts being incorrectly created between the time the part is formed and the time any build problems are discovered. As such, in-process monitoring of build quality may be desirable. However, processes that monitor build quality that utilize infrared cameras (e.g., melt pool monitoring), secondary x-ray monitoring, electron emission monitoring, or the like, may be costly to implement and/or may require modifications to existing electron beam additive manufacturing systems.

SUMMARY

In a first aspect, a monitoring system for an electron beam additive manufacturing system comprising a build chamber having at least one wall defining an interior of the build chamber that includes one or more measuring devices positioned on the at least one wall in the interior of the build chamber. Each one of the one or more measuring devices including a piezoelectric crystal. The monitoring system further includes an analysis component communicatively coupled to the one or more measuring devices. The analysis component is programmed to receive information pertaining to a frequency of oscillation of the piezoelectric crystal. A collection of material on the one or more measuring devices during formation of an article within the build chamber causes a change to the frequency of oscillation of the piezoelectric crystal, the change detectable by the analysis component and usable to determine a potential build anomaly of the article.

In a second aspect, an electron beam additive manufacturing system that includes a build chamber having at least one wall defining an interior of the build chamber and a monitoring system. The monitoring system includes one or more measuring devices positioned on the at least one wall in the interior of the build chamber. Each one of the one or more measuring devices includes a piezoelectric crystal. The monitoring system further includes an analysis component communicatively coupled to the one or more measuring devices. The analysis component is programmed to receive information pertaining to a frequency of oscillation of the piezoelectric crystal. A collection of material on the one or more measuring devices during formation of an article within the build chamber causes a change to the frequency of oscillation of the piezoelectric crystal, the change detectable by the analysis component and usable to determine a potential build anomaly of the article.

In a third aspect, a kit of parts for retrofitting an additive manufacturing system for sensing potential build anomalies includes one or more measuring devices. Each one of the one or more measuring devices includes a piezoelectric crystal and an analysis component programmed to receive information pertaining to a frequency of oscillation of the piezoelectric crystal. The kid also includes instructions for coupling the one or more measuring devices to an interior wall of a build chamber of the additive manufacturing system and communicatively coupling the one or more measuring devices to the analysis component such that, when the additive manufacturing system is utilized to form an article, a collection of material is formed on the one or more measuring devices, which causes a change to the frequency of oscillation of the piezoelectric crystal that is detectable by the analysis component and unstable to determine a potential build anomaly.

In a fourth aspect, a method of assessing a build quality of an additively manufactured part includes receiving build parameter data pertaining to one or more components of an additive manufacturing system, receiving voltage data from at least one voltmeter electrically coupled to a piezoelectric crystal positioned on an interior wall of a build chamber of the additive manufacturing system, determining a frequency of oscillation of the piezoelectric crystal from the voltage data, and determining a potential build anomaly on the additively manufactured part from the frequency of oscillation.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 1:
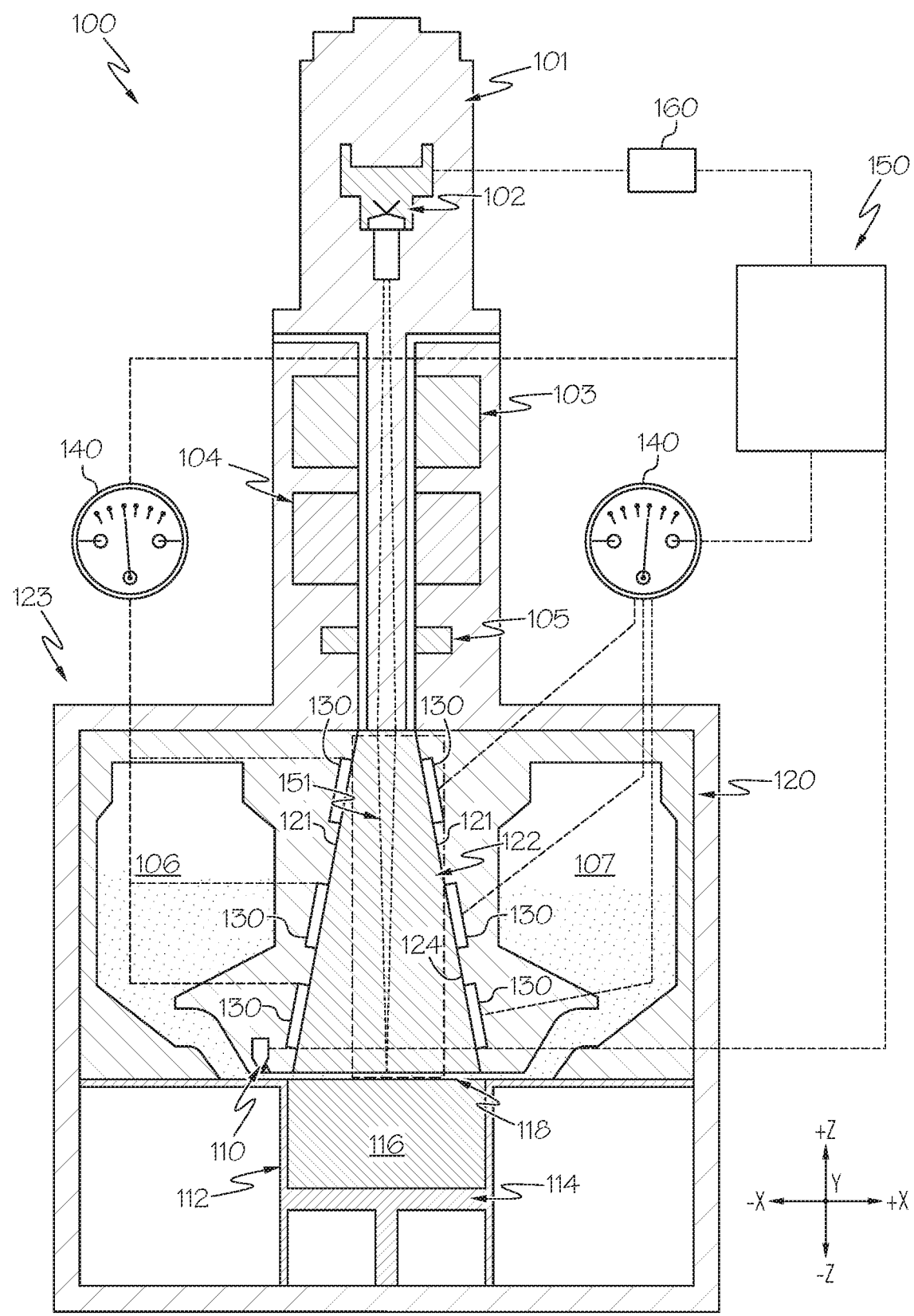
FIG. 1 schematically depicts a cutaway side view of an illustrative additive manufacturing system including one or more piezoelectric crystals coupled to one or more voltmeters according to one or more embodiments shown and described herein.

The present disclosure generally relates to devices, systems, methods, and kits of parts that monitor formation of metallic articles in an electron beam additive manufacturing process to ensure the metallic articles are appropriately formed. The devices, systems, methods, and kits of parts generally incorporate one or more piezoelectric crystals positioned at one or more locations within a build chamber of an electron beam additive manufacturing system. Each of the one or more piezoelectric crystals are electrically coupled to one or more voltmeters that measure a voltage generated by the one or more piezoelectric crystals. Specifically, the voltmeters determine a voltage change that occurs due to a change in frequency of the one or more piezoelectric crystals caused by deposition of metallic material on the one or more piezoelectric crystals. This deposition of metallic material is a result of the vaporized metal that forms within the build chamber during an electron beam additive manufacturing process and collects in various locations within the build chamber, including on the one or more piezoelectric crystals. One such particularly configured additive manufacturing system that includes one or more piezoelectric crystals and/or one or more voltmeters is depicted in FIG. 1, as described in greater detail herein.

Electron-beam additive manufacturing, which may also be known as electron-beam melting (EBM), is a type of additive manufacturing (e.g., 3D printing) process that is typically used for metallic articles. EBM utilizes a raw material in the form of a metal powder or a metal wire, which is placed under a vacuum (e.g., within a vacuum sealed build chamber). Generally speaking, the raw material is fused together from heating via an electron beam.

The systems described herein that utilize EBM generally obtain data from a 3D computer-aided design (CAD) model and use the data to place successive layers of the raw material using an apparatus to spread the raw material, such as a powder distributor. The successive layers are melted together utilizing one or more electronically-controlled electron beams. As noted above, the process takes place under vacuum within a vacuum sealed build chamber, which makes the process suited to manufacture parts using reactive materials having a high affinity for oxygen (e.g., titanium). In embodiments, the process operates at higher temperatures (up to about 1000° C.) relative to other additive manufacturing processes, which can lead to differences in phase formation through solidification and solid-state phase transformation.

One byproduct of EBM is the vaporization of the raw material that occurs during application of the electron beams. This vaporized raw material is generally dispersed throughout the build chamber, and eventually results in a buildup of the raw material on various surfaces of the build chamber, such as on the walls of the build chamber. During some manufacturing processes, a buildup of material may occur in particular locations depending on the various parameters of the build process, such as the location of the focus of the electron beam, the shape of the article being formed in a particular area thereof, and/or the like. These buildups of raw material, if they occur on a measuring device such as a piezoelectric crystal, can affect the frequency of the piezoelectric crystal, as described in greater detail herein.

Referring now to the figures, FIG. 1 depicts an embodiment of the present disclosure whereby an illustrative additive manufacturing system 100 includes one or more measuring devices 130 and one or more voltmeters 140 included with various other components of the additive manufacturing system. As shown in FIG. 1, the additive manufacturing system 100 further includes at least a build chamber 120, one or more electron beam (EB) guns (FIG. 1 depicting an EB gun 101), and an analysis component 150.

Referring to FIG. 1, the build chamber 120 defines an interior 122 that is separated from an exterior environment 123 via one or more chamber walls 121 having an interior surface 124 thereof. In some embodiments, the interior 122 of the build chamber 120 may be a vacuum sealed interior such that an article 116 formed within the build chamber 120 is formed under optimal conditions for EBM, as is generally understood. The build chamber 120 is capable of maintaining a vacuum environment via a vacuum system (not shown). Illustrative vacuum systems may include, but are not limited to, a turbo molecular pump, a scroll pump, an ion pump, and one or more valves, as are generally understood. In some embodiments, the vacuum system may be communicatively coupled to the analysis component 150 such that the analysis component 150 directs operation of the vacuum system to maintain the vacuum within the interior 122 of the build chamber 120. In some embodiments, the vacuum system may maintain a base pressure of about $1 \times 10^{-5}$ mbar or less throughout an entire build cycle. In further embodiments, the vacuum system may provide a partial pressure of He to about $2 \times 10^{-3}$ mbar during a melting process.

In other embodiments, the build chamber 120 may be provided in an enclosable chamber provided with ambient air and atmosphere pressure. In yet other embodiments, the build chamber 120 may be provided in open air.

Figure 2:
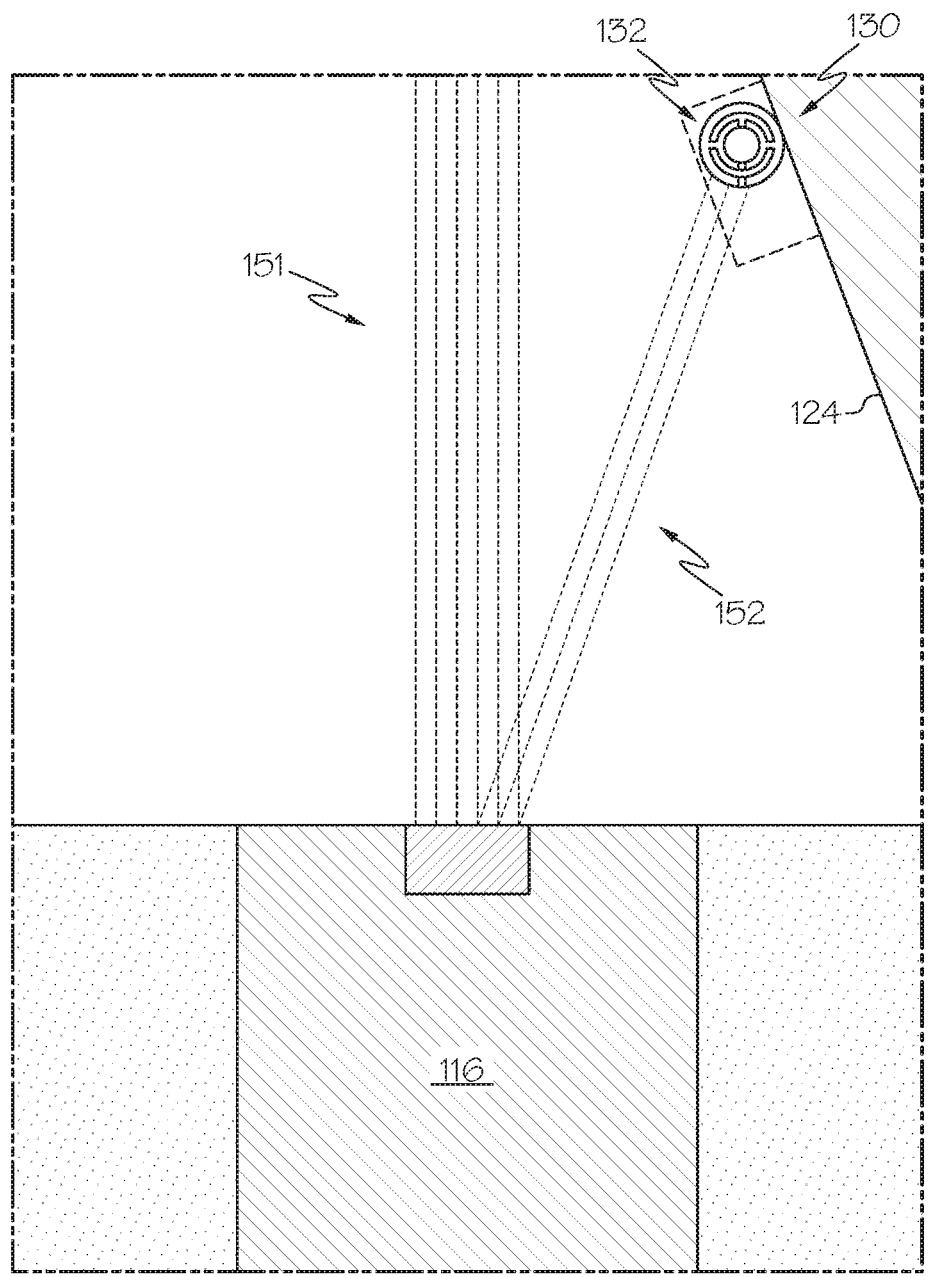
FIG. 2 schematically depicts a detailed cutaway side view of a portion of the build chamber depicting an illustrative piezoelectric crystal according to one or more embodiments shown and described herein.

The one or more measuring devices 130 are generally positioned at various locations on the interior surface 124 of the one or more chamber walls 121 and positioned such that vaporized metal that results from EBM settles on the one or more measuring devices 130. For example, FIG. 2 depicts the electron beam 151 contacting the raw material to form the article 116, which results vaporization of the raw material, as indicated by dashed lines of the vaporized particles 152 extending between the article 116 and the measuring device 130 on the interior surface 124. While FIG. 2 depicts the vaporized particles 152 as moving in a straight line from the article 116 to the measuring device 130, this is merely illustrative. That is, the vaporized particles 152 may scatter randomly or may move in another manner towards various portions of the interior surface 124.

While FIG. 1 depicts six measuring devices 130 spaced equidistantly from one another on the interior surface 124 of the chamber walls 121, the present disclosure is not limited to such. The one or more measuring devices 130 may be positioned at any location with respect to other measuring devices 130 (if any), particularly in locations where a buildup of raw material is expected. In some embodiments, the additive manufacturing system 100 may include a single measuring device 130. In other embodiments, the additive manufacturing system may include a plurality of measuring devices 130.

Each one of the one or more measuring devices 130 generally includes a crystal resonator that experiences the piezoelectric effect. Accordingly, the resonator is referred to herein as a piezoelectric crystal 132. Illustrative examples of crystals may include, but are not limited to, naturally occurring crystals such as quartz, Berlinite ($AlPO_4$), sucrose, Rochelle salt, topaz, Tourmaline-group minerals, and lead titanate ($PbTiO_3$), synthetic crystals such as Langasite ($La_3Ga_5SiO_{14}$), gallium orthophosphate ($GaPO_4$), lithium niobate ($LiNbO_3$), and lithium tantalite ($LiTaO_3$), synthetic ceramics such as barium titanate ($BaTiO_3$), lead zirconate titanate ($Pb[Zr_xTi_{1-x}]O_3$, also known as PZT), potassium niobate ($KNbO_3$), sodium tungstate ($Na_2WO_3$), and zinc oxide ($ZnO$), lead-free piezoceramics, III-V and II-VI semiconductors, polymers, and the like. In some embodiments, each of the one or more measuring devices 130 may also include water cooling tubes, a retaining unit, frequency sensing equipment through a microdot feed-through, an oscillation source, electrodes, and a measurement and recording device (e.g., the one or more voltmeters 140), which allows for application of a voltage and measurement of the standing shear wave.

The piezoelectric effect generally includes applications in high power sources, sensors, actuators, frequency standards, motors, and/or the like, and the relationship between applied voltage and mechanical deformation is generally understood. In embodiments, each of the one or more measuring devices 130 may be configured to apply an alternating current to the piezoelectric crystal 132 to induce oscillations of the piezoelectric crystal 132, which generates a standing shear wave.

The frequency of oscillation of the piezoelectric crystal 132 is partially dependent on the thickness of the crystal. During normal operation, all the other influencing variables remain constant. Thus, a change in thickness correlates directly to a change in frequency. As mass is deposited on the surface of the crystal (e.g., metal from the metal vapor within the interior 122 of the chamber), the thickness increases. Consequently, the frequency of oscillation decreases from the initial value. With some simplifying assumptions, this frequency change can be quantified and correlated precisely to the mass change using, for example, the Sauerbrey equation, which is defined in Equation (1) as:

$$\Delta f = -\frac{2f_0^2}{A\sqrt{\rho_q \mu_q}} \Delta m \quad (1)$$

where $f_0$ is a resonant frequency of the fundamental mode (Hz), $\Delta f$ is the normalized frequency change (Hz), $\Delta m$ is the mass change (g), A is the piezoelectrically active crystal area (area between electrodes, $cm^2$), $\rho_q$ is the density of the piezoelectric material (e.g., quartz is 2.648 $g/cm^3$), and $\mu_q$ is the shear modulus of the piezo electric material (e.g., quartz for AT-cut crystal is $2.947 \times 10^{11}$ $g \cdot cm^{-1} \cdot s^{-2}$).

Figure 3:
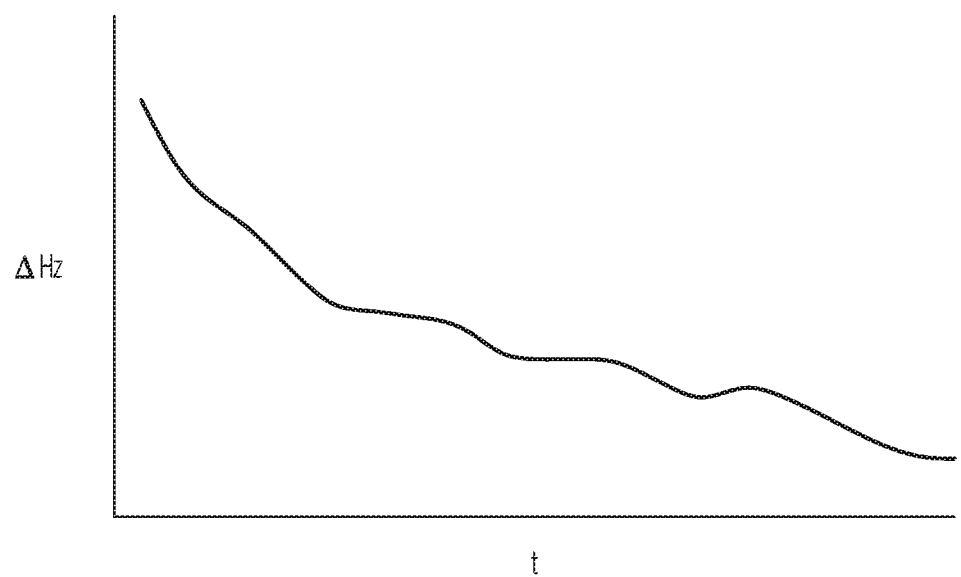
FIG. 3 graphically depicts an illustrative change in resonance frequency as the thickness of the material that builds up on a piezoelectric crystal increases according to one or more embodiments shown and described herein.

One illustrative method of measurement that may be employed by the one or more measuring devices 130 and/or the one or more voltmeters 140 is quartz crystal microbalance (QCM). QCM measures a mass variation per unit area by measuring the change in frequency of a quartz crystal resonator. The resonance is disturbed by the addition or removal of a small mass due to deposition of the vaporized metal at the surface of the acoustic resonator. In some embodiments, the method of measurement may be a non-gravimetric QCM method. In other embodiments, the method of measurement may be a gravimetric QCM method, which exploits the Sauerbrey equation by using a thickness monitor and may utilize langasite ($La_3Ga_5Si_{14}$) or gallium orthophosphate ($GaPO_4$) due to their ability to oscillate at the high temperatures present in the interior 122 of the build chamber 120. The thickness of the material that builds up on the crystal is measured and a change in resonance frequency is determined. In some embodiments, the change in resonance frequency may be directly correlated to the thickness of the material that builds up on the crystal. For example, as depicted in FIG. 3, as the thickness t of the material on the surface of the crystal increases, the change in resonance frequency decreases.

Referring again to FIG. 1, in embodiments, each of the one or more voltmeters 140 is generally a device that is electrically coupled to or integrated with one or more of the measuring devices 130 and particularly configured to measure a change in voltage of the piezoelectric crystal 132 of the associated measuring devices 130, which is, in turn, used to determine the frequency of the piezoelectric crystal 132, as described herein. In some embodiments, the one or more voltmeters 140 may be located within the interior 122 of the build chamber 120. In other embodiments, the one or more voltmeters 140 may be located outside the interior 122 of the build chamber 120 (e.g., in the exterior environment) so as to not expose the one or more voltmeters 140 to the harsh conditions of the build chamber 120 (as depicted in FIG. 1). In still other embodiments, the voltmeters 140 may be integrated as part of the analysis component 150 (e.g., as a DAQ (data acquisition) device). The electrical coupling of the one or more voltmeters 140 with the associated measuring devices 130 (as indicated by the dashed lines in FIG. 1 extending between each measuring device 130 and an associated voltmeter 140) allow for the electrical signal generated by the measuring devices 130 to be transmitted to the one or more voltmeters 140 for analysis.

The build chamber 120 generally includes within the interior 122 a build envelope 112 supporting a powder layer 118 thereon, as well as a powder distributor 110. In some embodiments, the build chamber 120 may further include one or more raw material hoppers 106, 107 that maintain raw material therein. The build chamber 120 may further include other components, particularly components that facilitate EBM, including components not specifically described herein.

The build envelope 112 is generally a platform or receptacle located within the interior 122 of the build chamber 120 that is arranged to receive the raw material from the one or more raw material hoppers 106, 107. The build envelope 112 is not limited in size or configuration by the present disclosure, but may generally be shaped and sized to hold an amount of the raw material from the raw material hoppers 106, 107 in the form of the powder layer 118, one or more portions of article 116, and/or unfused raw material, as described in greater detail herein.

In some embodiments, the build envelope 112 may include a movable build platform 114 supported by a lifting component (not shown). The movable build platform 114 may generally be a surface within the build envelope 112 that is movable by the lifting component in a system vertical direction (e.g., in the +z/−z directions of the coordinate axes of FIG. 1) to increase and/or decrease a total volume of the build envelope 112. For example, the movable build platform 114 within the build envelope 112 may be movable by the lifting component in a downward direction (e.g., toward the −z direction of the coordinate axes of FIG. 1) so as to increase the volume of the build envelope 112. The movable build platform 114 may be movable (e.g., capable of being lowered) by the lifting component to add each successive powder layer 118 to the article 116 being formed, as described in greater detail herein.

The lifting component is not limited by the present disclosure, and may generally be any device or system capable of being coupled to the movable build platform 114 and movable to raise or lower the movable build platform 114 in the system vertical direction (e.g., in the +z/−z directions of the coordinate axes of FIG. 1). In some embodiments, the lifting component may utilize a linear actuator type mechanism to effect movement of the movable build platform 114. Illustrative examples of devices or systems suitable for use as the lifting component include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some embodiments, the lifting component may be located within the interior 122 of the build chamber 120. In other embodiments, the lifting component may be only partially located within the interior 122 of the build chamber 120, particularly in embodiments where it may be desirable to isolate portions of the lifting component that are sensitive to the harsh conditions (e.g., high heat, excessive dust, etc.) within the interior 122 of the build chamber 120.

The powder distributor 110 is generally arranged and configured to lay down and/or spread a layer of the raw material as the powder layer 118 in the build envelope 112 (e.g., on start plate or the build platform 114 within the build envelope 112). That is, the powder distributor 110 is arranged such that movement of the powder distributor 110 is in a horizontal plane defined by the x-axis and the y-axis of the coordinate axes depicted in FIG. 1. For example, the powder distributor 110 may be an arm, rod, or the like that extends a distance in the y direction of the coordinate axes of FIG. 1 over or above the build envelope 112 (e.g., from a first end to a second end of the build envelope 112). In some embodiments, the length of the powder distributor 110 may be longer than a width of the build platform 114 such that the powder layer 118 can be distributed on each position of the build platform 114. In some embodiments, the powder distributor 110 may have a central axis in parallel with a top surface of the build platform 114 (e.g., generally parallel to the +x/−x axis of the coordinate axes of FIG. 1). One or more motors, actuators, and/or the like may be coupled to the powder distributor 110 to effect movement of the powder distributor 110. For example, a rack and pinion actuator may be coupled to the powder distributor 110 to cause the powder distributor 110 to move back and forth over the build envelope in the +x/−x directions of the coordinate axes of FIG. 1. In some embodiments, movement of the powder distributor 110 may be continuous (e.g., moving without stopping, other than to change direction). In other embodiments, movement of the powder distributor 110 may be stepwise (e.g., moving in a series of intervals, while stopping in between intervals for a period of time). In yet other embodiments, movement of the powder distributor 110 may be such that a plurality of interruptions occur between periods of movement.

The powder distributor 110 may further include one or more teeth (e.g., rake fingers or the like) that extend from the powder distributor 110 into the raw material from the raw material hoppers 106, 107 to cause disruption of the raw material when the powder distributor 110 moves (e.g., to distribute the raw material, to spread the powder layer 118, etc.). For example, the powder distributor 110 may include a plurality of rake teeth extending from a bottom surface of the powder distributor 110 (e.g., extending generally towards the −z direction of the coordinate axes of FIG. 1). In some embodiments, the rake teeth may extend in a direction that is substantially perpendicular to a plane of the build platform 114 (e.g., perpendicular to the plane formed by the x-axis and y-axis of the coordinate axes depicted in FIG. 1). In another embodiment, the rake teeth may be slanted with respect to the build platform 114. An angle of the slanted rake teeth with respect to a normal to the build platform may be any value, and in some embodiments is between about 0° and about 45°. In some embodiments, each one of the plurality of rake teeth may be a metal foil or a metal sheet. The total length of the plurality of rake teeth may be longer than a width of the build platform 114 in order to make it possible to distribute powder on each position of the build platform 114. The rake teeth may also be shaped and sized to rake through the raw material to distribute the powder layer 118 on the build platform 114.

It should be understood that while the powder distributor 110 described herein generally extends a distance in the x direction of the coordinate axes depicted in FIG. 1 and moves in the +x/−x directions of the coordinate axes depicted in FIG. 1 to spread the powder layer 118 as described above, this is merely one illustrative example. Other configurations are also contemplated. For example, the powder distributor 110 may rotate about an axis to spread the powder layer 118, may articulate about one or more joints or the like to spread the powder layer 118, and/or the like without departing from the scope of the present disclosure.

In some embodiments, a cross section of the powder distributor 110 may be generally triangular. However, it should be understood that the cross section may be any shape, including but not limited to, circular, elliptical, quadratic, rectangular, polygonal, or the like. A height of the powder distributor 110 may be set in order to give the powder distributor 110 a particular mechanical strength in the system vertical direction (e.g., along the +z/−z axis of the coordinate axes of FIG. 1). That is, in some embodiments, the powder distributor 110 may have a particular controllable flex in the system vertical direction. The height of the powder distributor 110 may also be selected taking into account that the powder distributor 110 pushes an amount of the raw material. If the height of the powder distributor 110 is too small, the powder distributor 110 can only push forward a smaller amount relative to a higher power powder distributor 110. However, if the height of the powder distributor 110 is too high, the powder distributor 110 may complicate the powder catching from a scree of powder, (e.g., the higher the height of the powder distributor 110, the more force may be required in order to catch a predetermined amount of powder from the scree of powder by moving the powder distributor 110 into the scree of powder and letting a predetermined amount of powder fall over the top of the powder distributor 110 from a first side in the direction of travel into the scree of powder to a second side in the direction of the build platform 114).

In some embodiments, the powder distributor 110 and each of the voltmeters 140 may be communicatively coupled to the analysis component 150, as depicted by the dashed line in FIG. 1 between the powder distributor 110 and the analysis component 150 and the dashed lines in FIG. 1 between the voltmeters 140 and the analysis component 150. As used herein, the term "communicatively coupled" generally refers to any link in a manner that facilitates communications. As such, "communicatively coupled" includes both wireless and wired communications, including those wireless and wired communications now known or later developed. For example, as the powder distributor 110 is communicatively coupled to the analysis component 150, the analysis component 150 may transmit one or more signals, data, and/or the like to cause the powder distributor 110 to move, change direction, change speed, and/or the like. More specifically, a "reverse direction" signal transmitted by the analysis component 150 to the powder distributor 110 may cause the powder distributor 110 to reverse the direction in which it is moving (e.g., reverse movement in the +x direction of the coordinate axes of FIG. 1 to movement in the −x direction of the coordinate axes of FIG. 1).

Each of the raw material hoppers 106, 107 may generally be containers that hold an amount of the raw material therein and contain an opening to dispense the raw material therefrom. While FIG. 1 depicts two raw material hoppers 106, 107, the present disclosure is not limited to such. That is, any number of raw material hoppers may be utilized without departing from the scope of the present disclosure. Further, while FIG. 1 depicts the raw material hoppers 106, 107 as being located within the interior 122 of the build chamber 120, the present disclosure is not limited to such. That is, the raw material hoppers 106, 107 may be located outside or partially outside the build chamber 120 in various other embodiments. However, it should be understood that if a raw material hopper is located outside or partially outside the build chamber 120, one or more outlets of the raw material hoppers that supply the raw material may be selectively sealed when not distributing the raw material in order to maintain the vacuum within the build chamber 120.

The shape and size of the raw material hoppers 106, 107 are not limited by the present disclosure. That is, the raw material hoppers 106, 107 may generally have any shape and or size without departing from the scope of the present disclosure. In some embodiments, each of the raw material hoppers 106, 107 may be shaped and or sized to conform to the dimensions of the build chamber 120 such that the raw material hoppers 106, 107 can fit inside the build chamber 120. In some embodiments, the raw material hoppers 106, 107 may be shaped and sized such that a collective volume of the raw material hoppers 106, 107 is sufficient to hold an amount of raw material that is necessary to fabricate the article 116, which includes a sufficient amount of material to form each successive powder layer 118 and additional material that makes up the unfused raw material.

The raw material hoppers 106, 107 may generally have an outlet for ejecting the raw material located within the raw material hoppers 106, 107 such that the raw material can be spread by the powder distributor 110, as described herein. In some embodiments, such as the embodiment depicted in FIG. 1, the raw material may freely flow out of the raw material hoppers 106, 107 under the force of gravity, thereby forming piles or scree of raw material for the powder distributor 110 to spread. In other embodiments, the outlets of the raw material hoppers 106, 107 may be selectively closed via a selective closing mechanism so as to only distribute a portion of the raw material located within the respective raw material hoppers 106, 107 at a particular time. The selective closing mechanisms may be communicatively coupled to the analysis component 150 such that data and/or signals transmitted to/from the analysis component 150 can be used to selectively open and close the outlets of the raw material hoppers 106, 107 (not shown in FIG. 1).

The raw material contained within the raw material hoppers 106, 107 and used to form the article 116 is not limited by the present disclosure, and may generally be any raw material used for EBM now known or later developed. Illustrative examples of raw material include, but are not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material include, but are not limited to, $Ti_6Al_4V$ titanium alloy, $Ti_6Al_4V$ ELI titanium alloy, Grade 2 titanium, and ASTM F75 cobalt-chrome (all available from Arcam A B, Mölndal, Sweden). Another specific example of raw material is INCONEL® alloy 718 available from Special Metals Corporation (Huntington W. Va.).

In embodiments, the raw material is pre-alloyed, as opposed to a mixture. This may allow classification of EBM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

Still referring to FIG. 1, the EB gun 101 is generally a device that emits an electron beam (e.g., a charged particle beam), such as an electron gun, a linear accelerator, or the like. The EB gun 101 generates a beam 151 that may be used for melting or fusing together the raw material when spread as the powder layer 118 on the build platform 114.

In some embodiments, the EB gun 101 includes an electron emitter 102, at least one focusing coil 104, and at least one deflection coil 105. In some embodiments, the EB gun 101 may further include at least one astigmatism coil 103 (e.g., a stigmator). In still other embodiments, the EB gun 101 may include a power supply (not shown), which may be electrically connected to at least one gun control unit 160, the electron emitter 102, the at least one astigmatism coil 103, the at least one focusing coil 104, and/or the at least one deflection coil 105. In some embodiments, the various components of the EB gun 101 are arranged such that the at least one astigmatism coil 103, the at least one focusing coil 104, and the at least one deflection coil 105 are positioned relative to the electron emitter 102 such that electrons emitted by the electron emitter 102 are passed through a void defined by each of the coils 103, 104, 105. In the embodiment depicted in FIG. 1, the at least one astigmatism coil 103 may be positioned closest to the electron emitter 102 relative to the at least one focusing coil 104 and the at least one deflection coil 105, the focusing coil 104 may be positioned closer to the electron emitter 102 relative to the at least one deflection coil 105, and the at least one deflection coil 105 may be positioned farthest away from the electron emitter 102. However, this is merely illustrative, and other positions of the various coils relative to the electron emitter 102 are contemplated and included within the scope of the present disclosure.

The electron emitter 102 is generally an electron beam emitting component containing a filament/cathode and/or an anode electrically coupled to the power supply via the gun control unit 160. The electron emitter 102 emits electrons into free space generally in a direction towards a space defined in the center of the coils 103, 104, 105 as a result of application of an electric current generated by the power supply. That is, the electrons emitted by the electron emitter 102 are generally directed in the direction indicated by the beam 151 in FIG. 1. In some embodiments, to ensure a directed emission of electrons therefrom, the electron emitter 102 may be formed into a particular shape that is adapted for such an electron emission. For example, the electron emitter 102 may be formed in a loop, as a tip having a particular radius of curvature, as one or more legs spaced apart from one another, and/or the like. The electron emitter 102 may be constructed of a particular material for emitting electrons, such as tungsten (W), lanthanum hexaboride (LaB$_6$), or the like. In some embodiments, the electron emitter 102 may be formed as the result of an etching process. An illustrative electron emitter may be provided by Energy Beam Sciences, Inc. (East Granby, Conn.). In one illustrative embodiment, the electron emitter 102 may produce a focusable electron beam with an accelerating voltage of about 60 kilovolts (kV) and with a beam power in the range of about 0 kilowatts (kW) to about 10 kW. It should be understood that the various features of the electron emitter 102 are merely illustrative, and that other features are also contemplated.

The at least one focusing coil 104 is generally a coil of electrically conductive material that has a plurality of turns/windings and is electrically coupled to a power source (e.g., the power supply). The at least one focusing coil 104 is positioned relative to the electron emitter 102 such that electrons emitted by the electron emitter are passed through a center of the at least one focusing coil 104 (e.g., a void defined by the plurality of turns/windings of the at least one focusing coil 104). That is, the at least one focusing coil 104 is oriented transverse to an axis defined by the beam 151 depicted in FIG. 1. The arrangement and location of the at least one focusing coil 104 relative to the electron emitter 102 and/or the shape and size of the plurality of turns/windings may be such that, when an electrical current is applied across the at least one focusing coil 104, a magnetic field is generated in the void defined by the turns/windings. The magnetic field acts as a lens for the electrons emitted by the electron emitter 102, converging the electrons into an electron beam having a single focal point. As such, modification of the electrical current applied across the at least one focusing coil 104 alters the magnetic field, which in turn alters the focal point of the electron beam. In some embodiments, the at least one focusing coil 104 may be referred to as a "focusing lens" (e.g., a focusing electromagnetic lens).

The at least one deflection coil 105 is generally a coil of electrically conductive material that has a plurality of turns/windings and is electrically coupled to a power source (e.g., the power supply). The at least one deflection coil 105 is positioned relative to the electron emitter 102 and/or the at least one focusing coil 104 such that electrons emitted by the electron emitter 102 and focused into a beam by the at least one focusing coil 104 are passed through a center of the at least one deflection coil 105 (e.g., a void defined by the plurality of turns/windings of the at least one deflection coil 105). That is, the at least one deflection coil 105 is oriented transverse to an axis defined by the beam 151 depicted in FIG. 1. The arrangement and location of the at least one deflection coil 105 relative to the electron emitter 102 and/or the at least one focusing coil 104 and/or the shape and size of the plurality of turns/windings may be such that, when an electrical current is applied across the at least one deflection coil 105, a magnetic field and/or an electrical field is generated in the void defined by the turns/windings. The magnetic field and/or electrical field acts to direct the electron beam emitted by the electron emitter 102 and focused by the at least one focusing coil 104, causing the electron beam to be directed to a particular location based on the characteristics of the magnetic field and/or electrical field. As such, modification of the electrical current applied across the at least one deflection coil 105 alters the magnetic field and/or electrical field, which in turn alters the path of travel of the electron beam. In some embodiments, the at least one deflection coil 105 may be referred to as a "deflection lens" (e.g., a deflecting electromagnetic lens).

The at least one astigmatism coil 103 is generally a coil of electrically conductive material that has a plurality of turns/windings and is electrically coupled to a power source (e.g., the power supply). The at least one astigmatism coil 103 is positioned relative to the electron emitter 102 such that electrons emitted by the electron emitter 102 are passed through a center of the at least one astigmatism coil 103 (e.g., a void defined by the plurality of turns/windings of the at least one astigmatism coil 103). That is, the at least one astigmatism coil 103 is oriented transverse to an axis defined by the beam 151 depicted in FIG. 1. The arrangement and location of the at least one astigmatism coil 103 relative to the electron emitter 102 and/or the shape and size of the plurality of turns/windings may be such that, when an electrical current is applied across the at least one astigmatism coil 103, a magnetic field is generated in the void defined by the turns/windings. The magnetic field acts to correct any focus defects present in the electrons emitted by the electron emitter 102, causing the electrons to converge in a beam that is radially uniform. As such, modification of the electrical current applied across the at least one astigmatism coil 103 alters the magnetic field, which in turn alters the electron beam distortion. In some embodiments, the at least one astigmatism coil 103 may be referred to as an "astigmatism lens" (e.g., an astigmatic electromagnetic lens).

While the embodiment of FIG. 1 only depicts three coils (e.g., the at least one astigmatism coil 103, the at least one focusing coil 104, and the at least one deflection coil 105), it should be understood that this is merely illustrative. Fewer or additional coils may be included within the EB gun 101 without departing from the scope of the present disclosure. In one particular embodiment, the EB gun 101 may include six coils therein, where at least one of the six coils is a focusing coil and at least one of the six coils is a deflection coil.

The power supply is generally any component that provides electrical power to the components of the EB gun 101 (e.g., the electron emitter 102, the at least one astigmatism coil 103, the at least one focusing coil 104, and/or the at least one deflection coil 105). The power supply may have a plurality of power outputs, each of the plurality of power outputs coupled to one of the components of the EB gun 101. As such, the power supply can modulate the electricity provided to each of the component of the EB gun 101 independently of one another. That is, a first voltage, frequency, and/or the like can be provided to a first component of the EB gun 101 and a second voltage, frequency, and/or the like can be provided to a second component of the EB gun 101. Control of the electricity provided to the various components of the EB gun 101 may be achieved by the gun control unit 160, which is electrically coupled to the power supply and/or each of the components of the EB gun 101 (e.g., the electron emitter 102, the at least one astigmatism coil 103, the at least one focusing coil 104, and/or the at least one deflection coil 105). That is, the gun control unit 160 controls the electricity provided to each of the components of the EB gun 101 to ensure that a particular voltage, a particular frequency, and/or the like is supplied to each component of the EB gun 101 to ensure a particular control of the characteristics of the electron beam emitted by the EB gun 101.

In some embodiments, the power supply is a Tesla transformer, as it produces multi-megavolt pulses of very high power (e.g., on the order of tens of megawatts). In embodiments, the pulse repetition rate may be about twice the frequency of the supply mains, and may be limited only by a deionization time of a single spark-gap switch. When a high-voltage pulse is applied by the power supply, driving a cathode of the electron emitter 102 to a large negative potential, the electric field at the cathode face becomes so great that emission of electrons occurs. The electrons may be released normal to the face of the cathode and are accelerated through an evacuated region of a gun barrel of the EB gun 101 by the electric field of the cathode through the magnetic fields and/or electrical fields produced by the various coils 103, 104, 105.

It should be understood that the EB gun 101 may include other components that are not specifically recited herein. In a nonlimiting example, the EB gun 101 may further include one or more focusing lens, one or more astigmatic lenses, one or more deflection lenses, one or more pumps (e.g., turbo pumps), one or more gate valves, one or more apertures, and/or the like. In some embodiments, the EB gun 101 may include a plurality of columns (e.g., an upper column arranged above a lower column). Such columns may include a pressure differential therebetween (e.g., a pressure differential of about $10^{-4}$ mbar).

Still referring to FIG. 1, the pressure in the build chamber 120 may be in the range of from about $1 \times 10^{-3}$ mBar to about $1 \times 10^{-6}$ mBar when forming the article 116 by fusing each successive powder layer 118 with the beam 151. In some embodiments, the EB gun 101 may be communicatively coupled to the analysis component 150, as indicated in FIG. 1 by the dashed line between the EB gun 101 and the analysis component 150. The communicative coupling of the EB gun 101 to the analysis component 150 may provide an ability for signals and/or data to be transmitted between the EB gun 101 and the analysis component 150, such as control signals from the analysis component 150 that direct operation of the EB gun 101. That is, the analysis component 150 may transmit one or more signals to the EB gun 101, the one or more signals directing operation of the EB gun 101.

The analysis component 150 is generally a device that is communicatively coupled to one or more components of the additive manufacturing system 100 (e.g., the powder distributor 110, the one or more voltmeters 140, and/or the EB gun 101) and is particularly arranged and configured to transmit and/or receive signals and/or data to/from the one or more components of the additive manufacturing system 100. Additional details regarding the analysis component 150 are discussed herein with respect to FIGS. 4A-4B.

Figure 4A:
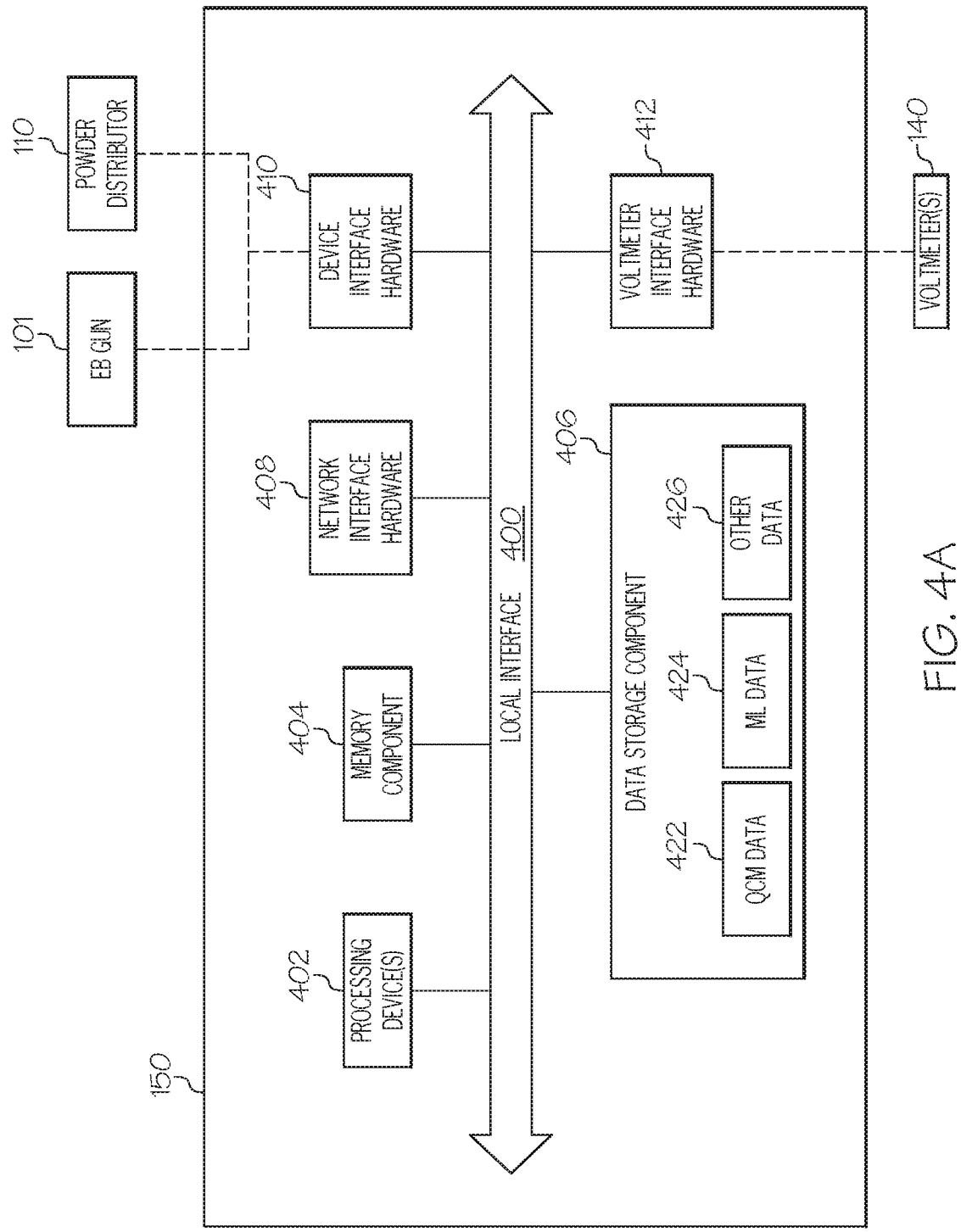
FIG. 4A schematically depicts a block diagram of illustrative components contained within a control unit according to one or more embodiments shown and described herein.

Turning to FIG. 4A, the various internal components of the analysis component 150 depicted in FIG. 1 are shown. Particularly, FIG. 4A depicts various system components for analyzing data received from the one or more voltmeters 140 of FIG. 1 and/or assisting with the control of various components of the additive manufacturing system 100 depicted in FIG. 1.

As illustrated in FIG. 4A, the analysis component 150 may include one or more processing devices 402, a non-transitory memory component 404, network interface hardware 408, device interface hardware 410, a data storage component 406, and/or voltmeter interface hardware 412. A local interface 400, such as a bus or the like, may interconnect the various components.

The one or more processing devices 402, such as a computer processing unit (CPU), may be the central processing unit of the analysis component 150, performing calculations and logic operations to execute a program. The one or more processing devices 402, alone or in conjunction with the other components, are illustrative processing devices, computing devices, processors, or combinations thereof. The one or more processing devices 402 may include any processing component configured to receive and execute instructions (such as from the data storage component 406 and/or the memory component 404).

The memory component 404 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 404 may include one or more programming instructions thereon that, when executed by the one or more processing devices 402, cause the one or more processing devices 402 to complete various processes, such as the processes described herein with respect to FIGS. 6 and 7.

Figure 4B:
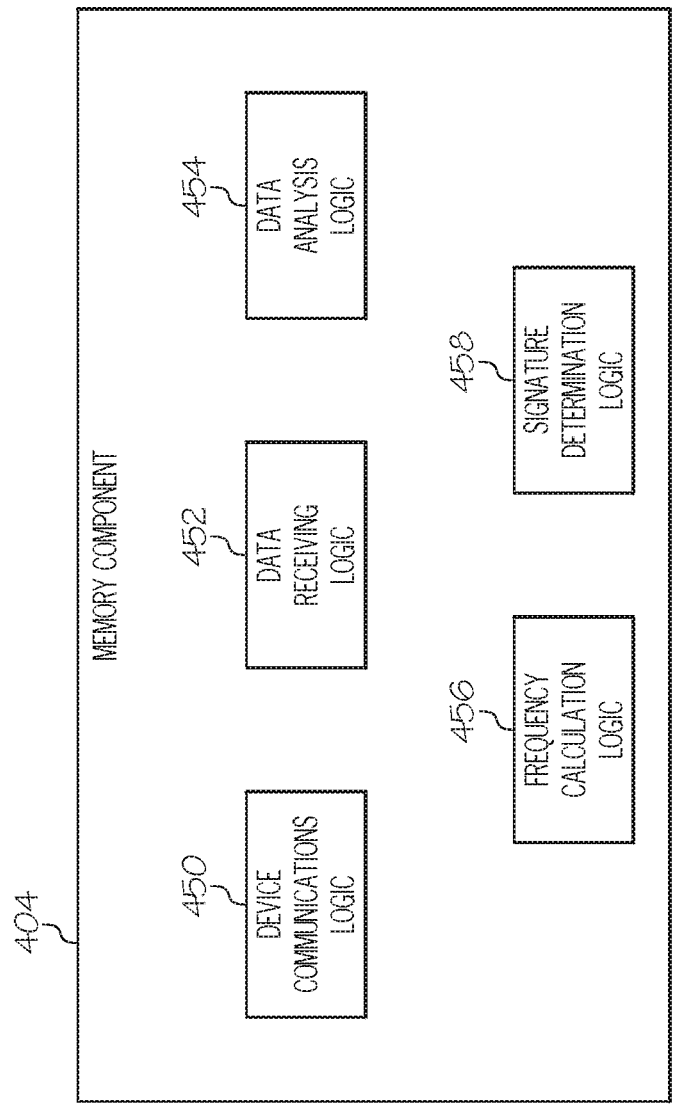
FIG. 4B depicts a block diagram of illustrative modules contained within a memory component of a control unit according to one or more embodiments shown and described herein.

Still referring to FIG. 4A, the programming instructions stored on the memory component 404 may be embodied as a plurality of software logic modules, where each logic module provides programming instructions for completing one or more tasks. FIG. 4B depicts the various modules of the memory component 404 of FIG. 4A according to various embodiments.

As shown in FIG. 4B, the memory component 404 includes a plurality of logic modules. Each of the logic modules shown in FIG. 4B may be embodied as a computer program, firmware, or hardware, as an example. Illustrative examples of logic modules present in the memory component 404 include, but are not limited to, device communications logic 450, data receiving logic 452, data analysis logic 454, frequency calculation logic 456, and/or signature determination logic 458. Other logic modules not specifically described herein are also contemplated and are included within the scope of the present disclosure.

Referring to FIGS. 1, 4A and 4B, the device communications logic 450 includes one or more programming instructions for causing a communications connection between one or more components of the additive manufacturing system 100 with one or more components of the analysis component 150. For example, the device communications logic 450 may include one or more programming instructions for directing communications between the powder distributor 110 and the analysis component 150, directing communications between the one or more voltmeters 140 and the analysis component 150, directing communications between the EB gun 101 and the analysis component 150, and/or the like. In another example, the device communications logic 450 may contain programming instructions for working in tandem with the programming instructions of the data receiving logic 452 to establish connections with the one or more voltmeters 140.

Still referring to FIGS. 1, 4A and 4B, the data receiving logic 452 includes one or more programming instructions for receiving data from the one or more voltmeters 140. That is, the data receiving logic 452 may cause a connection between the voltmeter interface hardware 412 and the one or more voltmeters 140 such that data transmitted by the one or more voltmeters 140 (e.g., data pertaining to a change in voltage) is received by the analysis component 150. Further, the data transmitted by the one or more voltmeters 140 may be stored (e.g., within the data storage component 406).

Referring to FIGS. 1, 4A, and 4B, the data analysis logic 454 includes one or more programming instructions for analyzing the data received from the one or more voltmeters 140. That is, the data analysis logic 454 contains programming for analyzing the data pertaining to the electrical signals received from the voltmeters 140 that corresponds to the detected changes in frequency of the one or more measuring devices 130 that result from collection of vaporized particles on the one or more measuring devices 130, as described herein. The data analysis logic 454 may further include programming instructions for analyzing data continuously as the article 116 is formed (e.g., analyzing data in real-time as it is received during operation of the additive manufacturing system 100).

Still referring to FIGS. 1, 4A, and 4B, the frequency calculation logic 456 may include programming instructions for determining, from the voltage data received from the one or more voltmeters, the frequency of oscillations of the one or more measuring devices 130, as well as a change in frequency (if any) from an initial frequency of the one or more measuring devices 130 (thus indicating a deposition of material on the one or more measuring devices 130). The frequency calculation logic 456 may further include programming instructions for determining frequency as the article 116 is formed (e.g., determining frequency and/or changes in frequency in real-time as it is received during operation of the additive manufacturing system 100).

Still referring to FIGS. 1, 4A, and 4B, the signature determination logic 458 may include programming instructions for determining what characteristics of the article 116 being formed (or a portion thereof) and/or parameters of various components of the additive manufacturing system 100 (e.g., parameters of the EB gun 101 and/or components thereof) signify the change in frequency determined by the programming instructions of the frequency calculation logic 456, whether the frequency determined by the programming instructions of the frequency calculation logic 456 correspond to particular parameters (e.g., correct parameters, incorrect parameters, expected parameters, unexpected parameters, and/or the like), and/or the like. For example, the signature determination logic 458 may include programming instructions for retrieving correlation data from a database, determining whether the correlation data corresponds to the frequency (or change in frequency) determined by the frequency calculation logic 456, and if the correlation data does not correspond to the frequency (or change in frequency), determine one or more reasons for why the correlation data does not correspond.

Referring again to FIG. 4A, the network interface hardware 408 may include any wired or wireless networking hardware, such as a modem, LAN port, wireless fidelity (Wi-Fi) card, WiMax card, long term evolution (LTE) card, mobile communications hardware, and/or other hardware for communicating with other networks and/or devices. For example, the network interface hardware 408 may be used to facilitate communication between external storage devices, user computing devices, server computing devices, external control devices, and/or the like via a network, such as a local network, the Internet, and/or the like, as described herein with respect to FIG. 5.

Referring to FIGS. 1 and 4A, the device interface hardware 410 may communicate information between the local interface 400 and one or more components of the additive manufacturing system 100 of FIG. 1, particularly the EB gun 101 and/or the powder distributor 110. In some embodiments, the device interface hardware 410 may transmit or receive signals and/or data to/from the EB gun 101, transmit control signals to the gun control unit 160 to effect control of the EB gun 101 and/or components thereof (e.g., the coils 103, 104, 105 of the EB gun 101, a power supply of the EB gun 101, the electron emitter 102 of the EB gun 101, and/or the like). In some embodiments, the device interface hardware 410 may transmit or receive signals and/or data to/from the powder distributor 110.

Referring again to FIG. 4A, the data storage component 406, which may generally be a storage medium, may contain one or more data repositories for storing data that is received and/or generated. The data storage component 406 may be any physical storage medium, including, but not limited to, a hard disk drive (HDD), memory, removable storage, and/or the like. While the data storage component 406 is depicted as a local device, it should be understood that the data storage component 406 may be a remote storage device, such as a server computing device, cloud based storage device, or the like. Illustrative data that may be contained within the data storage component 406 includes, but is not limited to, QCM data 422, machine learning (ML) data 424, and/or other data 426. Referring also to FIG. 1, the QCM data 422 may generally be data that is generated and/or received as a result of measurement of a change in frequency of oscillation of the one or more measuring devices 130, the calculation of a change in mass due to deposition of material on the one or more measuring devices 130, and/or the calculation of an amount of material deposited on the one or more measurement devices based on the calculated mass. In some embodiments, the QCM data 422 may be generated by the analysis component 150, by a combination of the one or more voltmeters 140 and the analysis component, or by a combination of the one or more measuring devices 130, the one or more voltmeters 140, and the analysis component 150. In some embodiments, the QCM data 422 (or a portion and/or precursor thereof) may be transmitted by the one or more voltmeters 140 and/or the one or more measuring devices 130.

Still referring to FIGS. 1 and 4A, the ML data 424 may be data that is generated as a result one or more machine learning processes that are utilized as a result of or for the purposes of determining an amount of material deposited on the one or more measuring devices 130 and corresponding characteristics of the article 116, as a result of or for the purposes of determining an amount of material deposited on the one or more measuring devices 130 and corresponding parameters of the various components of the additive manufacturing system 100 (e.g., parameters the EB gun 101 and/or components thereof), as a means of determining what one or more characteristics of the article 116 and/or parameters of the various components of the additive manufacturing system 100 should be based on certain depositions of material on the one or more measuring devices 130, and/or the like. For example, machine learning may be employed to assess whether a particular article 116 is properly formed based on the amount of material that is deposited on each of the one or more measuring devices 130 at a particular point in time, changes in the amount of material that is deposited on each of the one or more measuring devices 130 over a period of time, and/or the like. As such, data that allows a trained model to be formed may be stored as a portion of the ML data 424 in some embodiments.

Referring to FIGS. 1 and 4A, the voltmeter interface hardware 412 may communicate information between the local interface 400 and the one or more voltmeters 140. In some embodiments, the voltmeter interface hardware 412 may transmit or receive signals and/or data to/from each of the one or more voltmeters 140.

It should be understood that the components illustrated in FIG. 4A are merely illustrative and are not intended to limit the scope of this disclosure. More specifically, while the components in FIG. 4A are illustrated as residing within the analysis component 150, this is a nonlimiting example. In some embodiments, one or more of the components may reside external to the analysis component 150.

Figure 5:
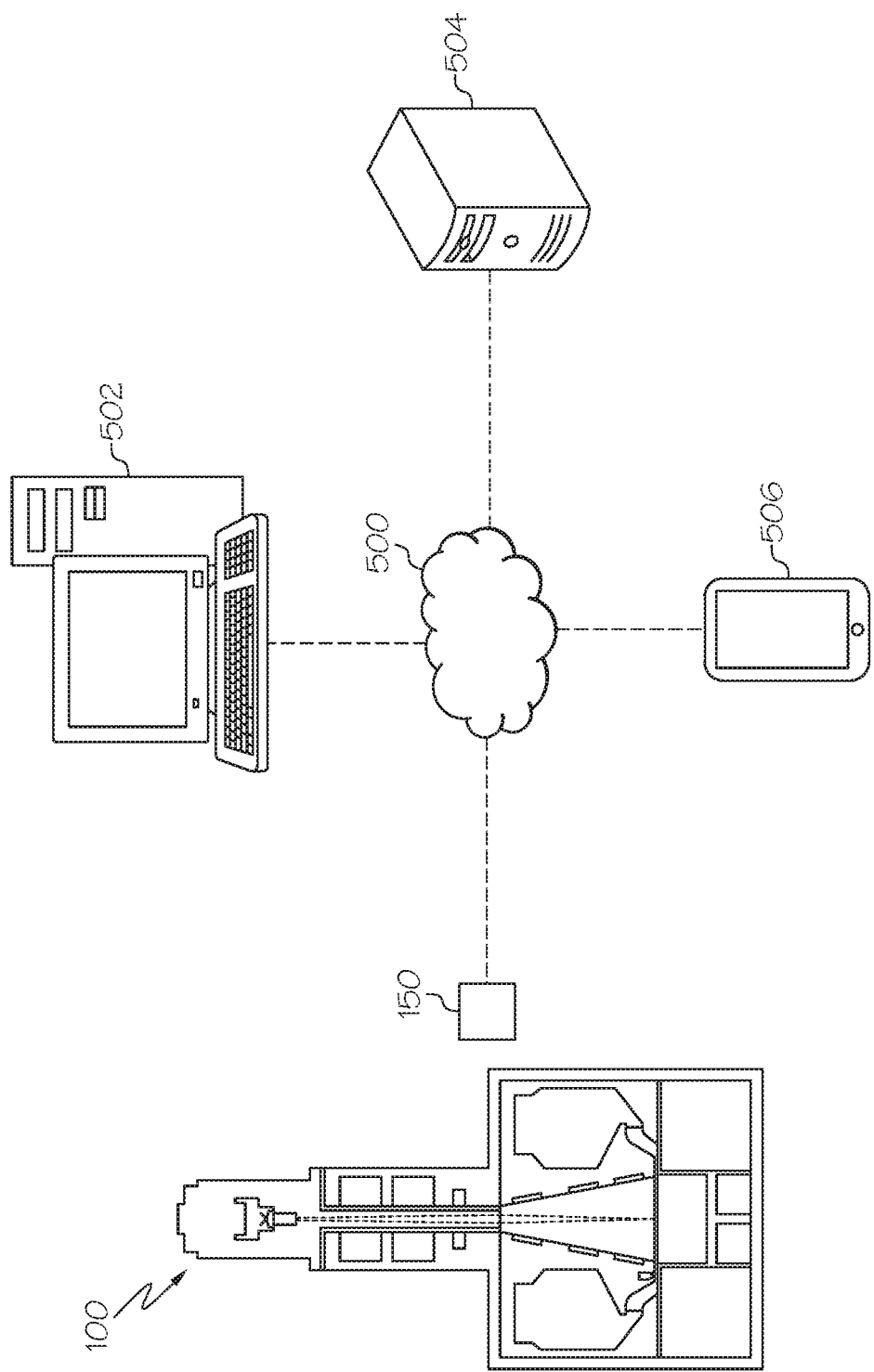
FIG. 5 depicts an illustrative control network according to one or more embodiments shown and described herein.

Referring now to FIG. 5, an illustrative control network 500 is depicted. As illustrated in FIG. 5, the control network 500 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The control network 500 may generally be configured to electronically connect one or more systems and/or devices, such as computing devices, servers, electronic devices, additive manufacturing systems, and/or components of any of the foregoing. Illustrative systems and/or devices may include, but are not limited to, a user computing device 502, a database server 504, an electronic device 506, and/or the analysis component 150 of the additive manufacturing system 100 of FIG. 1.

Still referring to FIG. 5, the user computing device 502 may generally be used as an interface between a user and the other components connected to the control network 500. Thus, the user computing device 502 may be used to perform one or more user-facing functions, such as receiving one or more inputs from a user or providing information to the user. Accordingly, the user computing device 502 may include at least a display and/or input hardware. In the event that any of the other devices connected to the control network 500 (e.g., the database server 504, the electronic device 506, and/or the analysis component 150), requires oversight, updating, and/or correction, the user computing device 502 may be configured to provide the desired oversight, updating, and/or correction. The user computing device 502 may also be used to input data that is usable to determine a type of material being used for additive manufacture, various parameters for the additive manufacturing system 100 (or a component thereof), a desired strategy for forming an article using the additive manufacturing system 100 (e.g., EB gun movement strategy), and/or the like. That is, a user may input information via the user computing device 502 to control various parameters of the additive manufacturing process. In some embodiments, the user computing device 502 may provide a user with information pertaining to any detected anomalies in article manufacture based on a determination made from the various processes described herein. For example, the user computing device 502 may provide one or more error messages, one or more detailed descriptions, one or more options for further action, and/or the like to a user via the user interface.

The database server 504 is generally a repository of data that is used for the purposes of determining correlations between deposition of material and article formation as described herein. That is, the database server 504 may contain one or more storage devices for storing data pertaining to information received from the one or more voltmeters (FIG. 1), any generated calculations, machine learning related information, and/or the like. In some embodiments, the database server 504 may contain information therein that mirrors the information stored in the data storage component 406 (FIG. 4A) or may be used as an alternative to the data storage component 406 (FIG. 4A), such as an offsite data repository. The database server 504 may be accessible by one or more other devices and/or systems coupled to the control network 500 and may provide the data as needed.

The electronic device 506 may generally be any device that contains hardware that is operable to be used as an interface between a user and the other components of the control network 500. Thus, the electronic device 506 may be used to perform one or more user-facing functions, such as receiving data from one or more external components, displaying information to a user, receiving one or more user inputs, transmitting signals corresponding to the one or more user inputs, and/or the like. While FIG. 5 depicts the electronic device 506 as a smart phone, it should be understood that this is a nonlimiting example. That is, the electronic device 506 may be any mobile phone, a tablet computing device, a personal computing device (e.g., a personal computer), and/or the like. In some embodiments, the electronic device 506 may have similar functionality as the user computing device 502, as described herein.

It should be understood that while the user computing device 502 is depicted as a personal computer, the database server 504 is depicted as a server, and the electronic device 506 is depicted as a mobile device, these are nonlimiting examples. In some embodiments, any type of computing device (e.g., mobile computing device, personal computer, server, cloud-based network of devices, etc.) or specialized electronic device may be used for any of these components. Additionally, while each of these computing devices is illustrated in FIG. 5 as a single piece of hardware, this is also merely an example. Each of the user computing device 502, the database server 504, and the electronic device 506 may represent a plurality of computers, servers, databases, components, and/or the like.

While FIG. 5 depicts the various systems and/or components communicatively coupled to one another via the control network 500, this is merely illustrative. In some embodiments, various components may be communicatively coupled to one another via a direct connection. In some embodiments, various components may be integrated into a single device.

It is contemplated that certain components of the additive manufacturing system 100 described herein may be separately provided as a kit of parts which may be used to retro fit additive manufacturing systems which do not have the piezoelectric crystal measuring devices 130. For example, in one embodiment, a kit of parts for retrofitting an additive manufacturing system for sensing build anomalies may include at least one piezoelectric crystal measuring device and at least one voltmeter which are packaged together or integrated into a single component as described herein. In addition, the kit of parts for retrofitting an additive manufacturing system may also include interface hardware for interfacing the at least one piezoelectric crystal measuring device and/or the at least one voltmeter with an existing control component (e.g., an existing analysis device), and/or one or more components coupled to the control network 500. In some embodiments, the kit of parts may also include one or more programming instructions or other software modules that are installed in the existing computing devices of the additive manufacturing system for operating the at least one piezoelectric crystal measuring device and/or the at least one voltmeter and/or for retrieving information therefrom. Alternatively, the software may be provided as part of an additional hardware component (e.g., an additional memory module) that is communicatively coupled to existing computing components. The kit may further include instructions for affixing the at least one piezoelectric crystal measuring devices and/or the at least one voltmeter to existing components of an additive manufacturing system as described herein.

As noted above, the kit of parts may be used to retrofit and convert an existing additive manufacturing system to an additive manufacturing system with article formation monitoring capabilities. The various parts of the kit of parts may be installed within or near the build chamber as described hereinabove, thereby converting the existing additive manufacturing system to an additive manufacturing system having an article formation monitoring system.

The various embodiments depicted in FIGS. 1-3, 4A-4B, and 5 should now generally be understood. That is, the embodiment depicted in FIGS. 1-2 includes the build chamber 120 with, among other components, the one or more measuring devices 130 and the one or more voltmeters 140. In the embodiment depicted FIGS. 4A-4B, the analysis component 150 may include various internal components that provide functionality for the analysis component 150 to determine a change in frequency, determine an amount of material deposited on the one or more measuring devices 130, determine corresponding characteristics of an article 116 and/or parameters of the additive manufacturing system 100. Further, external control of the various components of FIGS. 1-2 and 4A-4B can be completed using one or more of the components depicted in the embodiment of FIG. 5.

In operation, the additive manufacturing system 100 is activated and programmed to begin forming the article 116. As the article 116 is formed and vaporized material is formed and deposits on the interior surfaces 124 of the chamber walls 121 of the build chamber 120 and the one or more measuring devices 130, the amount of material deposited on the one or more measuring devices 130 is measured by observing a change in voltage, determining a corresponding change in frequency, and determining a thickness and/or mass of the material that causes the change in frequency. This change is compared to an expected amount of material that should be deposited based on historical or baseline data, particular parameters or settings, particular areas or features of the article 116 being formed, a particular period of time that has elapsed during formation, and/or the like. A determination is made as to whether an anomaly exists, and one or more actions may be taken as a result, such as transmitting an error message, adjusting build parameters, stopping the build process, receiving inputs from a user, determining other corrective action, and/or the like. As a result, any issues pertaining to formation of the article 116 can be detected and potentially rectified at the time of formation rather than after formation, thereby avoiding delays, a plurality of incorrectly formed articles, and the like.

Referring to FIG. 1, during formation of the article 116, the build platform 114 may be lowered successively in relation to the EB gun 101 (e.g., in the −z direction of the coordinate axes depicted in FIG. 1) after each added powder layer 118 is placed. This means that the build platform 114 starts in an initial position, in which a first powder layer 118 of a particular thickness is laid down on the build platform. In some embodiments, the first powder layer 118 may be thicker than the other applied layers, so as to avoid a melt-through of the first layer onto the build platform 114. The build platform 114 is thereafter lowered in connection with laying down a second powder layer 118 for the formation of a new cross section of the article 116. In an example embodiment, the article 116 may be formed through successive fusion of layers the raw material supplied from the raw material hoppers 106, 107 on the build platform 114 (e.g., successive fusion of layers of powder layer 118). Each layer corresponds to successive cross sections of the article 116. Such a fusion may be particularly completed based on instructions generated from a model the article 116. In some embodiments, the model may be generated via a CAD (Computer Aided Design) tool.

In embodiments, the EB gun 101 generates an electron beam 151 that, when contacting the raw material located on the build platform 114, melts or fuses together the raw material to form a first layer of the powder layer 118 on the build platform 114, which results in the vaporized material being released and deposited within the build chamber 120. In some embodiments, the analysis component 150 may be used for calibrating, controlling, and managing the electron beam 151 emitted from the EB gun 101 by transmitting one or more signals and/or data to the EB gun 101 to adjust the coils 103, 104, 105 thereof, adjust the electron emitter 102 thereof, and/or the like. In an illustrative embodiment, the EB gun 101 generates a focusable electron beam with an accelerating voltage of about 60 kilovolts (kV) and with a beam power in the range of about 0 kilowatts (kW) to about 3 kW. A pressure in the interior 122 of the build chamber 120 may be in the range of about $10^{-3}$ millibars (mBar) to about $10^{-6}$ mBar when constructing the article 116 by fusing each successive powder layer 118 with the electron beam 151.

In embodiments, a particular amount of raw material may be provided on the build platform 114. The particular amount of raw material is provided on the build platform 114 from one or more of the raw material hoppers 106, 107, in which the raw material is ejected through the respective outlets on the raw material hoppers 106, 107, thereby creating a scree of raw material on the build platform 114. It should be understood that the use and arrangement of the raw material hoppers 106, 107 to supply the raw material used for forming the powder layer 118 described herein is merely illustrative. That is, other arrangements of supplying and providing raw material, such as a powder container with a moving floor located outside the build chamber 120 or the like is also contemplated and included within the scope of the present disclosure.

In embodiments, a layer from the raw material may be provided on build platform 114. The layer from the raw material may then be collected by the powder distributor 110 by moving the powder distributor 110 a particular distance in a first direction (e.g., in a direction along the plane formed by the x-axis and the y-axis of the coordinate axes depicted in FIG. 1) into the scree of the raw material, thereby allowing a particular amount of the raw material to fall over a top of the powder distributor 110. The powder distributor 110 is then moved in a second direction (e.g., in another direction along the plane formed by the x-axis and the y-axis of the coordinate axes depicted in FIG. 1). In some embodiments, the second direction may be opposite to the first direction. Movement of the powder distributor 110 in the second direction may remove the particular amount of the raw material, which has fallen over the top of the powder distributor 110, from the scree of the raw material.

The particular amount of the raw material removed from the scree of the raw material (or provided by any other suitable mechanism) in front of the powder distributor 110

(e.g., adjacent to a leading end of the powder distributor 110) may be moved over the build envelope 112 and/or the build platform 114 by means of the powder distributor 110, thereby distributing the particular amount of the raw material over the build platform 114.

The electron beam 151 emitted from the EB gun 101 may be directed over the build platform 114, thereby causing the powder layer 118 to fuse in particular locations to form a first cross section of the article 116 according to the model generated via the CAD tool. The movement of the electron beam 151 is controlled by the EB gun 101 (including the components thereof, as described herein) such that the electron beam 151 is directed over the build platform 114 based on instructions provided by the analysis component 150 or another device. Contact of the electron beam 151 with the raw material results in vaporization of some material, which is dispersed throughout the build chamber 120 in a particular manner based on characteristics of the raw material, the portion of the article 116 being formed, parameters of the various components, and/or the like, as described herein.

After a first powder layer 118 is finished (e.g., after the fusion of raw material for making a first layer of the article 116), a second powder layer 118 is provided on the first powder layer 118. The second powder layer 118 may be distributed according to the same manner as the previous layer, as described herein. However, in some embodiments, there might be alternative methods in the same additive manufacturing machine for distributing the raw material. For instance, a first layer may be provided by means of a first powder distributor and a second layer may be provided by a second powder distributor.

After the second powder layer 118 is distributed on the first powder layer 118, the electron beam 151 is directed over the build platform 114, causing the second powder layer 118 to fuse in selected locations to form a second cross section of the article 116. Fused portions in the second layer may be bonded to fused portions of said first layer. The fused portions in the first and second layer may be melted together by melting not only the material in the uppermost layer but also remelting at least a portion of a thickness of a layer directly below the uppermost layer. As noted hereinabove, contact of the electron beam 151 with the material results in vaporization of some of the material, which is then dispersed throughout the build chamber 120. This process is repeated until the article 116 is fully formed or a signal is received to stop formation.

Since the piezoelectric crystal 132 used in each of the one or more measuring devices 130 has a baseline resonant frequency, it may be necessary to establish what the baseline is when no formation is being performed by the additive manufacturing system 100 and/or at the beginning of a formation process. Further, it may be necessary to establish an expected resonant frequency of the piezoelectric crystal 132 used in each of the one or more measuring devices 130 at particular times during a typical formation process, which can be used as a basis of determining whether a deviation from the typical formation process is detected. Accordingly, FIG. 6 schematically depicts a block diagram of an illustrative method of establishing such a baseline frequency of one or more piezoelectric crystals 132 for one or more particular additive manufacturing parameters.

Figure 6:
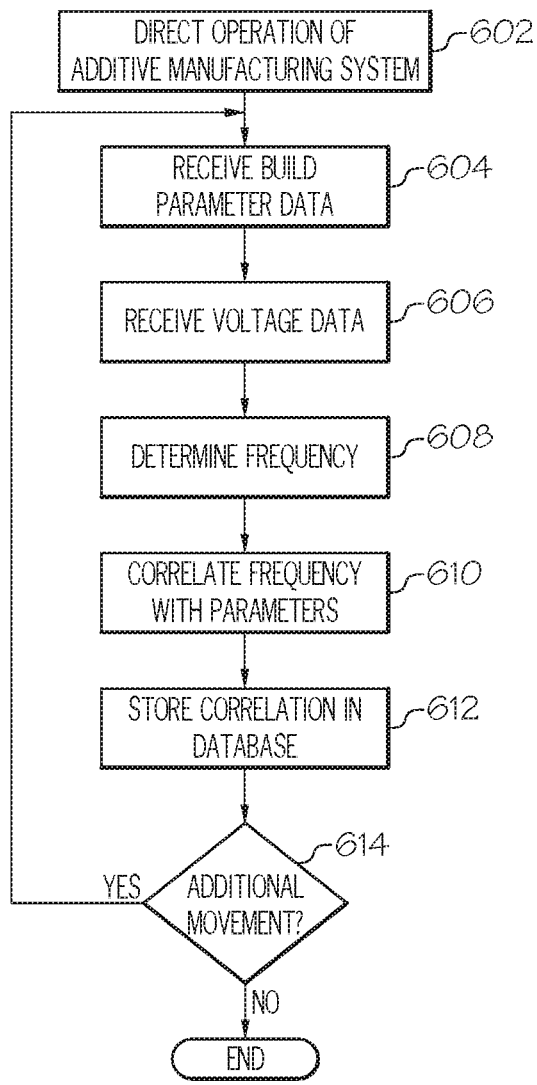
FIG. 6 depicts a flow diagram of an illustrative method of establishing a baseline frequency of one or more piezoelectric crystals for one or more particular additive manufacturing parameters in an additive manufacturing system according to one or more embodiments shown and described herein.

Referring to FIGS. 1 and 6, operation of the additive manufacturing system 100 is directed at block 602. That is, one or more signals are transmitted to one or more components of the additive manufacturing system 100 to begin additive formation of an article. Such signals may be transmitted, for example, by the analysis component 150 and/or one or more other control devices or components. For example, one or more signals may be transmitted to one or more components of the EB gun 101 (e.g., the gun control unit 160, the electron emitter 102, the coils 103, 104, 105), the powder distributer 110, one or more components that control movement of the build platform 114, one or more components that control flow of raw material from the raw material hoppers 106, 107, and/or the like. The signals may cause the process of forming the article 116 to commence. In some embodiments, the one or more signals may cause various components of the additive manufacturing system 100 to adjust certain parameters to ensure appropriate formation of the article 116. For example, a direction, speed, and/or height of the powder distributor may be adjusted to ensure particular characteristics of each layer of raw material. In another example, various settings may be adjusted at the EB gun (including the components thereof) to ensure an electron beam 151 having particular characteristics and aim when contacting the raw material. Build parameter data pertaining to the various build parameters that are adjusted may be received at block 604. In some embodiments, the build parameter data may be received by the analysis component 150. The build parameter data generally contains information pertaining to the parameters of the various components of the additive manufacturing system 100, information pertaining to the type of article 116 being formed (e.g., shape, size, structural features, and/or the like), and/or the like such that the characteristics of the vaporized material that forms on the one or more measuring devices 130 as a result of such parameters can be associated therewith, as described in greater detail herein.

As the build process proceeds (e.g., as the raw material is spread, the electron beam 151 is applied, and so on), the various voltage readings obtained by each of the voltmeters 140 are transmitted such that voltage data pertaining to the voltage readings is received by the analysis component 150 at block 606. As previously described herein, the voltage data represents a continuous amount of voltage that is outputted by each of the one or more measuring devices 130 over a period of time, which changes as material is deposited on the one or more measuring devices 130, thus causing changes in frequency of oscillation of the piezoelectric crystal 132 within each of the one or more measuring devices 130.

At block 608, the frequency of oscillation of the piezoelectric crystal 132 in each of the one or more measuring devices 130 is determined based on the voltage data that has been received. More specifically, the change in frequency over a period of time is determined according to block 608. Such a determination may be completed by any means of determining a frequency and/or a change in frequency now known or later developed. For example, Equation (1) described hereinabove may be used to determine a change in frequency.

At block 610, the determined frequency (and/or change in frequency) is correlated with the build parameters and stored in a database at block 612. That is, a database is constructed or updated where the database contains information pertaining to the various correlations. For example, if the build chamber 120 has a set of parameters X for a particular build and the received voltage data indicates that measuring device A has a first change in frequency and measuring device B has a second change in frequency, the parameters X, the first change in frequency of measuring device A (as well as information pertaining to a location of measuring device A), the second change in frequency of measuring device B (as well as information pertaining to a location of measuring device B) may be correlated together and stored in the database for future reference. As a result of this correlation, if a particular article is to be built using particular stored parameters (parameters X) of the build chamber 120 (and components thereof), it is expected that the change in oscillation frequency of measuring devices A and B will always be the same for parameters X. Referring also to FIG. 4A, the database may be the QCM data 422 stored in the data storage component 406 in some embodiments. Referring also to FIG. 5, the database may be stored on the database server 504 in some embodiments.

Referring again to FIGS. 1 and 6, since the measuring devices 130 are measuring throughout an entire build process, the processes with respect to blocks 604-612 may be continuously completed throughout the build process (thereby allowing for changes in frequency over time to be calculated). As such, a determination is made at block 614 as to whether additional movement is to be completed (e.g., whether the build process is continuing or ending). If the process is not over and building resumes (or does not cease), the process may return to blocks 604-612 to repeat the collection and correlation of data processes so that a full dataset of changes in voltage and oscillation is recorded for the entirety of a build process. Once the build process ends, the process according to FIG. 6 may also end.

The process described hereinabove with respect to FIG. 6 may establish a baseline of expected frequency changes over the time of a build process, which can be referred to during future builds to determine whether a deviation is detected, whether the deviation is statistically significant, and/or whether the deviation is indicative of an incorrectly formed article 116. Accordingly, FIG. 7 describes an illustrative method of determining whether the process of forming an article with known frequency changes is deviating from those known frequency changes, thereby potentially indicating one or more build issues and/or potentially resolving one or more build issues on the fly before a plurality of articles are formed with the same build issues.

Figure 7:
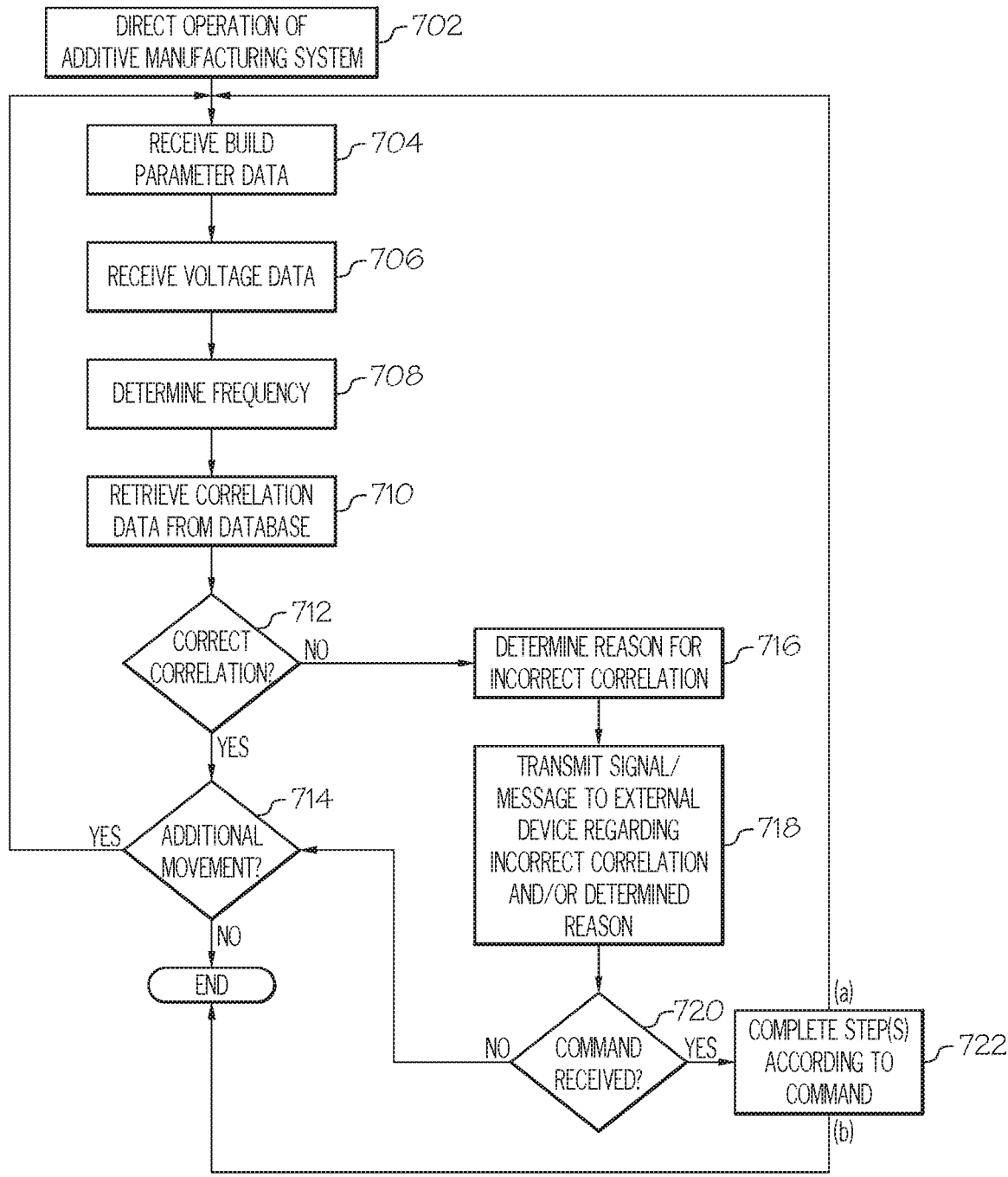
FIG. 7 depicts a flow diagram of an illustrative method of assessing build quality of an additively manufactured part during a build process using one or more piezoelectric crystals according to one or more embodiments shown and described herein.

Referring to FIGS. 1 and 7, operation of the additive manufacturing system 100 is directed at block 702. That is, one or more signals are transmitted to one or more components of the additive manufacturing system 100 to begin additive formation of an article. Such signals may be transmitted, for example, by the analysis component 150 and/or one or more other control devices or components. For example, one or more signals may be transmitted to one or more components of the EB gun 101 (e.g., the gun control unit 160, the electron emitter 102, the coils 103, 104, 105), the powder distributer 110, one or more components that control movement of the build platform 114, one or more components that control flow of raw material from the raw material hoppers 106, 107, and/or the like. The signals may cause the process of forming the article 116 to commence. In some embodiments, the one or more signals may cause various components of the additive manufacturing system 100 to adjust certain parameters to ensure appropriate formation of the article 116. For example, a direction, speed, and/or height of the powder distributor may be adjusted to ensure particular characteristics of each layer of raw material. In another example, various settings may be adjusted at the EB gun (including the components thereof) to ensure an electron beam 151 having particular characteristics and aim when contacting the raw material. Build parameter data pertaining to the various build parameters that are adjusted may be received at block 704. In some embodiments, the build parameter data may be received by the analysis component 150. The build parameter data generally contains information pertaining to the parameters of the various components of the additive manufacturing system 100, information pertaining to the type of article 116 being formed (e.g., shape, size, structural features, and/or the like), and/or the like such that the characteristics of the vaporized material that forms on the one or more measuring devices 130 as a result of such parameters can be associated therewith, as described in greater detail herein.

As the build process proceeds (e.g., as the raw material is spread, the electron beam 151 is applied, and so on), the various voltage readings obtained by each of the voltmeters 140 are transmitted such that voltage data pertaining to the voltage readings is received by the analysis component 150 at block 706. As previously described herein, the voltage data represents a continuous amount of voltage that is outputted by each of the one or more measuring devices 130 over a period of time, which changes as material is deposited on the one or more measuring devices 130, thus causing changes in frequency of oscillation of the piezoelectric crystal 132 within each of the one or more measuring devices 130.

At block 708, the frequency of oscillation of the piezoelectric crystal 132 in each of the one or more measuring devices 130 is determined based on the voltage data that has been received. More specifically, the change in frequency over a period of time is determined according to block 708. Such a determination may be completed by any means of determining a frequency and/or a change in frequency now known or later developed. For example, Equation (1) described hereinabove may be used to determine a change in frequency.

At block 710, the database is accessed such that the correlation data can be retrieved from the database. That is, referring also to FIGS. 4A and 5, the data may be retrieved from the QCM data 422 and/or the ML data 424 stored in the data storage component 406 in some embodiments and/or from the database server 504 in some embodiments. The data is generally the data that was previously stored as part of the processes described herein with respect to FIG. 6. However, the data may also be data that is derived from the data that was previously stored as part of the processes described herein with respect to FIG. 6. More specifically, the data may be data generated as a result of training a model from the data that was previously stored as part of the processes described herein with respect to FIG. 6.

Referring again to FIGS. 1 and 7, the retrieved data is used to determine at block 712 whether a correct correlation exists. That is, at block 712, a determination is made as to whether the retrieved data from the database corresponds to the frequency (or change in frequency) calculated at block 708. If the determined frequency (or change in frequency) does correspond to the retrieved correlation data (e.g., it is a correct correlation), then the process moves to block 714. If the determined frequency (or change in frequency) does not correspond to the retrieved correlation data (e.g., it is not a correct correlation), then the process moves to block 716. In some embodiments, such a determination according to block 712 may include determining whether the determined frequency (or change in frequency) is exactly the same as the correlation data for each of the one or more measuring devices 130. If it is not an exact match, the determination may be that it is not a correct correlation. In other embodiments, such a determination according to block 712 may include determining whether the determined frequency (or change in frequency) is within a predetermined range of error as the correlation data for each of the one or more measuring devices 130. That is, if the determined frequency (or change in frequency) is not within a particular range of the correlation data, the determination may be that it is not a correct correlation. The predetermined range of error may be calculated based on a plurality of data points that indicate what an acceptable range of error would be in some embodiments. In some embodiments, the predetermined range of error may be set by a user as being a particular range that is deemed acceptably close.

Since the measuring devices 130 are measuring throughout an entire build process, the processes with respect to blocks 704-712 may be continuously completed throughout the build process (thereby allowing for changes in frequency over time to be calculated). As such, a determination is made at block 714 as to whether additional movement is to be completed (e.g., whether the build process is continuing or ending). If the process is not over and building resumes (or does not cease), the process may return to blocks 704-712 to repeat the collection and comparison of data processes. Once the build process ends, the process according to FIG. 7 may also end.

If it has been determined that there is not a correct correlation at block 712, then at block 716, a determination may be made as to a reason for an incorrect correlation. For example, information from one or more sensors may be retrieved to determine further information that may be used to potentially determine a reason for an incorrect correlation. In another example, information pertaining to which of the one or more measuring devices 130 has a different-than-expected calculated frequency (or change in frequency), and the location of the measuring device(s) 130 that have the different-than-expected frequency may be used to determine that an excess buildup of material (or lack of material buildup) has occurred at particular locations, which could happen as the result of certain issues within the build chamber 120. Such a determination may be completed as a result of operation of a machine learning component utilizing a learned model that is trained to recognize certain anomalies that result when the data from the one or more measuring devices 130 is not what is expected. It should be understood that the process according to block 716 is optional. That is, in some embodiments, a determination may not be made as to what the reason is for the incorrect correlation. Rather, the process may proceed directly from block 712 to block 718.

At block 718, a signal and/or message is transmitted to an external device regarding the incorrect correlation and/or the determined reason for the incorrect correlation. For example, referring also to FIG. 5, a signal and/or message may be transmitted to the user computing device 502 and/or the electronic device 506 such that an error message is displayed to a user and/or one or more options are provided to the user for correcting the error, ignoring the error, changing one or more build parameters, stopping the build process, and/or the like. Accordingly, at block 720, a determination is made as to whether a command has been received. If no command is received (or if the system is not set up to receive a command from a user, but rather provides an error alert only), the process may return to block 714. If a command is received, the process continues to block 722. That is, if the user selects an option an user interface of the user computing device 502 and/or the electronic device 506 to correct the error, change one or more build parameters, stop the build process, or the like, the process may proceed to block 722.

At block 722, one or more steps may be completed according to the command that is received. That is, if a user selects an option to correct the error, one or more instructions may be transmitted to various components of the additive manufacturing system 100 that may result in an error correction. For example, if the data indicates that a particular area of the top layer of raw material was inadequately fused as described herein, the error correction instructions may include instructions for returning the electron beam 151 to the particular area and/or directing the powder distributor 110 to distribute additional powder to the particular area to fill in the inadequately fused area and correct the error. If a user selects an option to change one or more build parameters, one or more instructions may be transmitted to various components of the additive manufacturing system 100 that result in changes to the build parameter (e.g., changes in settings for the various components of the EB gun 101 or the like). If the user selects an option to stop the build process, one or more instructions may be transmitted to the various components of the additive manufacturing system 100 to shut down. In some embodiments, the process may return to block 704, particularly in instances where instructions or correct an error or change parameters are received, as indicated by directional arrow (a) in FIG. 7. Otherwise, the process may end if instructions to stop the process are received, as indicated by directional arrow (b) in FIG. 7.

It should now be understood that that the devices, systems, methods, and kits of parts described herein provide an additive manufacturing system that includes components that monitor formation of metallic articles in an electron beam additive manufacturing process to ensure the metallic articles are appropriately formed. The devices, systems, methods, and kits of parts generally incorporate one or more measuring components that each include a piezoelectric crystal and are positioned at one or more locations within a build chamber of an electron beam additive manufacturing system. Each of the one or more piezoelectric crystals are electrically coupled to one or more voltmeters that measure a voltage generated by the one or more piezoelectric crystals, as well as the change in voltage over time. Specifically, the voltmeters determine a voltage change that occurs due to a change in frequency of the one or more piezoelectric crystals caused by deposition of metallic material on the one or more piezoelectric crystals. This deposition of metallic material is a result of the vaporized metal that forms within the build chamber during an electron beam additive manufacturing process and collects in various locations within the build chamber, including the one or more piezoelectric crystals.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

1. A monitoring system for an electron beam additive manufacturing system comprising a build chamber having at least one wall defining an interior of the build chamber, the monitoring system comprising: one or more measuring devices positioned on the at least one wall in the interior of the build chamber, each one of the one or more measuring devices comprising a piezoelectric crystal; and an analysis component communicatively coupled to the one or more measuring devices, the analysis component programmed to receive information pertaining to a frequency of oscillation of the piezoelectric crystal, wherein a collection of material on the one or more measuring devices during formation of an article within the build chamber causes a change to the frequency of oscillation of the piezoelectric crystal, the change detectable by the analysis component and usable to determine a potential build anomaly of the article.

2. The monitoring system of any preceding clause, further comprising at least one voltmeter electrically coupled to the piezoelectric crystal of each of the one or more measuring devices, the at least one voltmeter communicatively coupled to the analysis component such that data pertaining to sensed voltage of the piezoelectric crystal is transmitted from the at least one voltmeter to the analysis component.

3. The monitoring system of any preceding clause, wherein each one of the one or more measuring devices comprises one of the at least one voltmeter.

4. The monitoring system of any preceding clause, wherein the at least one voltmeter is integrated within the analysis component as a data acquisition (DAQ) device.

5. The monitoring system of any preceding clause, wherein the piezoelectric crystal is a naturally occurring crystal, a synthetic crystal, a synthetic ceramic, a lead-free piezoceramic, a semiconductor, or a polymer.

6. The monitoring system of any preceding clause, wherein the analysis component is programmed to determine an amount of the material on the one or more measuring devices from the change in the frequency of oscillation.

7. The monitoring system of any preceding clause, wherein the one or more measuring devices utilize a gravimetric quartz crystal microbalance method of measuring.

8. An electron beam additive manufacturing system, the electron beam additive manufacturing system comprising: a build chamber comprising at least one wall defining an interior of the build chamber; and a monitoring system comprising: one or more measuring devices positioned on the at least one wall in the interior of the build chamber, each one of the one or more measuring devices comprising a piezoelectric crystal; and an analysis component communicatively coupled to the one or more measuring devices, the analysis component programmed to receive information pertaining to a frequency of oscillation of the piezoelectric crystal, wherein a collection of material on the one or more measuring devices during formation of an article within the build chamber causes a change to the frequency of oscillation of the piezoelectric crystal, the change detectable by the analysis component and usable to determine a potential build anomaly of the article.

9. The electron beam additive manufacturing system of any preceding clause, wherein the build chamber comprises a build envelope having a movable build platform, the movable build platform supporting the article thereon during formation.

10. The electron beam additive manufacturing system of any preceding clause, further comprising a powder distributor communicatively coupled to the analysis component, the powder distributor arranged to distribute raw material that is used to form the article.

11. The electron beam additive manufacturing system of any preceding clause, further comprising at least one electron beam gun, the at least one electron beam gun comprising one or more focusing coils and one or more deflection coils, each of the one or more focusing coils and the one or more deflection coils receiving a modifiable electrical current that adjusts an electromagnetic field within the coil, the electromagnetic field altering one or more properties of an electron beam emitted by the electron beam.

12. The electron beam additive manufacturing system of any preceding clause, wherein the monitoring system further comprises at least one voltmeter electrically coupled to the piezoelectric crystal of each of the one or more measuring devices, the at least one voltmeter communicatively coupled to the analysis component such that data pertaining to sensed voltage of the piezoelectric crystal is transmitted from the at least one voltmeter to the analysis component.

13. The electron beam additive manufacturing system of any preceding clause, wherein each one of the one or more measuring devices comprises one of the at least one voltmeter.

14. The electron beam additive manufacturing system of any preceding clause, wherein the at least one voltmeter is integrated within the analysis component as a data acquisition (DAQ) device.

15. The electron beam additive manufacturing system of any preceding clause, wherein the piezoelectric crystal is a naturally occurring crystal, a synthetic crystal, a synthetic ceramic, a lead-free piezoceramic, a semiconductor, or a polymer.

16. The electron beam additive manufacturing system of any preceding clause, wherein the analysis component is programmed to determine an amount of the material on the one or more measuring devices from the change in the frequency of oscillation.

17. The electron beam additive manufacturing system of any preceding clause, wherein the amount of the material on the one or more measuring devices is determined using a Sauerbrey equation.

18. The electron beam additive manufacturing system of any preceding clause, wherein the one or more measuring devices utilize a gravimetric quartz crystal microbalance method of measuring.

19. A kit of parts for retrofitting an additive manufacturing system for sensing potential build anomalies, the kit of parts comprising: one or more measuring devices, each one of the one or more measuring devices comprising a piezoelectric crystal; an analysis component programmed to receive information pertaining to a frequency of oscillation of the piezoelectric crystal; and instructions for coupling the one or more measuring devices to an interior wall of a build chamber of the additive manufacturing system and communicatively coupling the one or more measuring devices to the analysis component such that, when the additive manufacturing system is utilized to form an article, a collection of material is formed on the one or more measuring devices, which causes a change to the frequency of oscillation of the piezoelectric crystal that is detectable by the analysis component and unstable to determine a potential build anomaly.

20. The kit of parts of any preceding clause, further comprising at least one voltmeter; and instructions for electrically coupling the at least one voltmeter to the piezoelectric crystal of each of the one or more measuring devices and communicatively coupling the at least one voltmeter to the analysis component such that data pertaining to sensed voltage of the piezoelectric crystal is transmitted from the at least one voltmeter to the analysis component.

21. A method of assessing a build quality of an additively manufactured part, the method comprising: receiving build parameter data pertaining to one or more components of an additive manufacturing system; receiving voltage data from at least one voltmeter electrically coupled to a piezoelectric crystal positioned on an interior wall of a build chamber of the additive manufacturing system; determining a frequency of oscillation of the piezoelectric crystal from the voltage data; and determining a potential build anomaly on the additively manufactured part from the frequency of oscillation.

22. The method of any preceding clause, wherein determining the potential build anomaly comprises retrieving correlation data from a database; and determining that a correct correlation does not exist between the frequency of oscillation and the correlation data.

23. The method of any preceding clause, wherein determining the potential build anomaly further comprises determining a reason for an incorrect correlation.

24. The method of any preceding clause, wherein determining the potential build anomaly further comprises transmitting a signal or a message to an external device regarding the incorrect correlation.

25. The method of any preceding clause, wherein the correlation data from the database is generated from a method of establishing a baseline frequency of the piezoelectric crystal.

26. The method of any preceding clause, further comprising determining an additional movement of the one or more components of the additive manufacturing system.

What is claimed is:

1. An electron beam additive manufacturing system, comprising:
    a build chamber comprising at least one wall defining an interior of the build chamber; and
    a monitoring system comprising:
        one or more measuring devices positioned on the at least one wall in the interior of the build chamber, each one of the one or more measuring devices comprising a piezoelectric crystal; and
        an analysis component communicatively coupled to the one or more measuring devices, the analysis component programmed to receive information pertaining to a frequency of oscillation of the piezoelectric crystal,
        wherein a collection of material on the one or more measuring devices during formation of an article within the build chamber causes a change to the frequency of oscillation of the piezoelectric crystal, the change detectable by the analysis component
    and usable to determine a potential build anomaly of the article.

2. The electron beam additive manufacturing system of claim 1, wherein the build chamber comprises a build envelope having a movable build platform, the movable build platform supporting the article thereon during formation.

3. The electron beam additive manufacturing system of claim 1, further comprising a powder distributor communicatively coupled to the analysis component, the powder distributor arranged to distribute raw material that is used to form the article.

4. The electron beam additive manufacturing system of claim 1, further comprising at least one electron beam gun, the at least one electron beam gun comprising one or more focusing coils and one or more deflection coils, each of the one or more focusing coils and the one or more deflection coils receiving a modifiable electrical current that adjusts an electromagnetic field within the coil, the electromagnetic field altering one or more properties of an electron beam emitted by the electron beam.

5. The electron beam additive manufacturing system of claim 1, wherein the monitoring system further comprises at least one voltmeter electrically coupled to the piezoelectric crystal of each of the one or more measuring devices, the at least one voltmeter communicatively coupled to the analysis component such that data pertaining to sensed voltage of the piezoelectric crystal is transmitted from the at least one voltmeter to the analysis component.

6. The electron beam additive manufacturing system of claim 5, wherein each one of the one or more measuring devices comprises one of the at least one voltmeter.

7. The electron beam additive manufacturing system of claim 5, wherein the at least one voltmeter is integrated within the analysis component as a data acquisition (DAQ) device.

8. The electron beam additive manufacturing system of claim 1, wherein the piezoelectric crystal is a naturally occurring crystal, a synthetic crystal, a synthetic ceramic, a lead-free piezoceramic, a semiconductor, or a polymer.

9. The electron beam additive manufacturing system of claim 1, wherein the analysis component is programmed to determine an amount of the material on the one or more measuring devices from the change in the frequency of oscillation.

10. The electron beam additive manufacturing system of claim 9, wherein the amount of the material on the one or more measuring devices is determined using a Sauerbrey equation.

11. The electron beam additive manufacturing system of claim 1, wherein the one or more measuring devices utilize a gravimetric quartz crystal microbalance method of measuring.

* * * * *